United States Patent
Sakurai et al.

(10) Patent No.: US 7,486,310 B2
(45) Date of Patent: Feb. 3, 2009

(54) IMAGING APPARATUS AND IMAGE PROCESSING METHOD THEREFOR

(75) Inventors: Keiichi Sakurai, Akishima (JP); Tetsuji Makino, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 733 days.

(21) Appl. No.: 10/965,639

(22) Filed: Oct. 13, 2004

(65) Prior Publication Data

US 2005/0078192 A1 Apr. 14, 2005

(30) Foreign Application Priority Data

Oct. 14, 2003 (JP) ............................ 2003-354392

(51) Int. Cl.
- H04N 5/225 (2006.01)
- H04N 5/228 (2006.01)
- H04N 5/208 (2006.01)

(52) U.S. Cl. .............................. 348/207.99; 348/222.1; 348/252

(58) Field of Classification Search .............. 348/586, 348/590, 592, 221.1, 207.99; 382/154, 284, 382/285

See application file for complete search history.

(56) References Cited

U.S. PATENT DOCUMENTS

| | | | |
|---|---|---|---|
| 5,528,194 A * | 6/1996 | Ohtani et al. ............... | 382/293 |
| 6,304,298 B1 | 10/2001 | Steinberg et al. | |
| 6,442,293 B1 * | 8/2002 | Ito et al. ..................... | 382/154 |
| 6,674,485 B2 * | 1/2004 | Akiyama et al. ............ | 348/586 |
| 2003/0026482 A1 | 2/2003 | Dance | |

FOREIGN PATENT DOCUMENTS

| | | |
|---|---|---|
| JP | 3-094383 A | 4/1991 |
| JP | 5-101221 A | 4/1993 |
| JP | 9-289600 A | 11/1997 |
| JP | 11-098485 A | 4/1999 |
| JP | 2000-341501 A | 12/2000 |
| JP | 2001-134751 A | 5/2001 |

OTHER PUBLICATIONS

Clark, Paul et al. "Estimating the Orientation and Recovery of Text Planes in a Single Image" Proceedings of the 12th British Machine Vision Conference, BMVC 2001, Sep. 10, 2001, pp. 421-430, XP002314536.

Clark, Paul et al. "On the Recovery of Oriented Documents from Single Images" ACIVS' 2002: Advanced Concepts for Intelligent Vision Systems Univ. Gent, Belgium, Sep. 9, 2002, pp. 190-197, XP002314537.

Faugeras, Olivier, "Three-Dimensional Computer Vision A Geometric Viewpoint", 2001, The MIT Press, Cambridge, MA, pp. 36-41.

* cited by examiner

Primary Examiner—Lin Ye
Assistant Examiner—Trung Diep
(74) Attorney, Agent, or Firm—Frishauf, Holtz, Goodman & Chick, P.C.

(57) ABSTRACT

A digital camera has a CPU and an image processing apparatus. The image processing apparatus acquires a contour from an image acquired by shooting a whiteboard as a shooting target by using a Roberts filter. The image processing apparatus detects straight lines to be candidates which form the image of the whiteboard from the acquired contour, and acquires the rectangular shape of the whiteboard. The image processing apparatus acquires projection parameters indicating the relationship between the image of the whiteboard and the real whiteboard from vertex positions of the quadrangle, and performs projection transformation of the image of the whiteboard.

11 Claims, 31 Drawing Sheets

FIG. 4
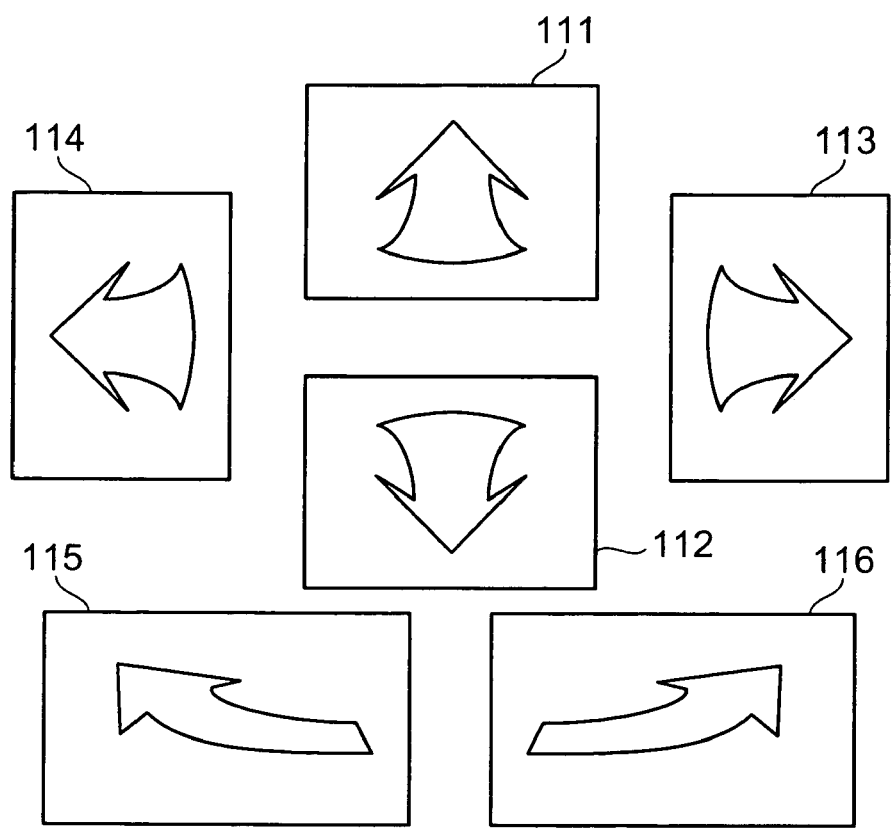
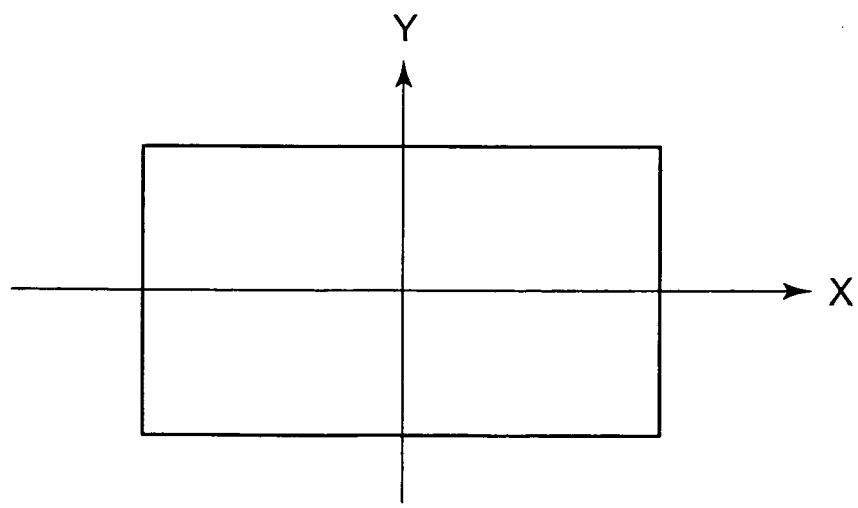

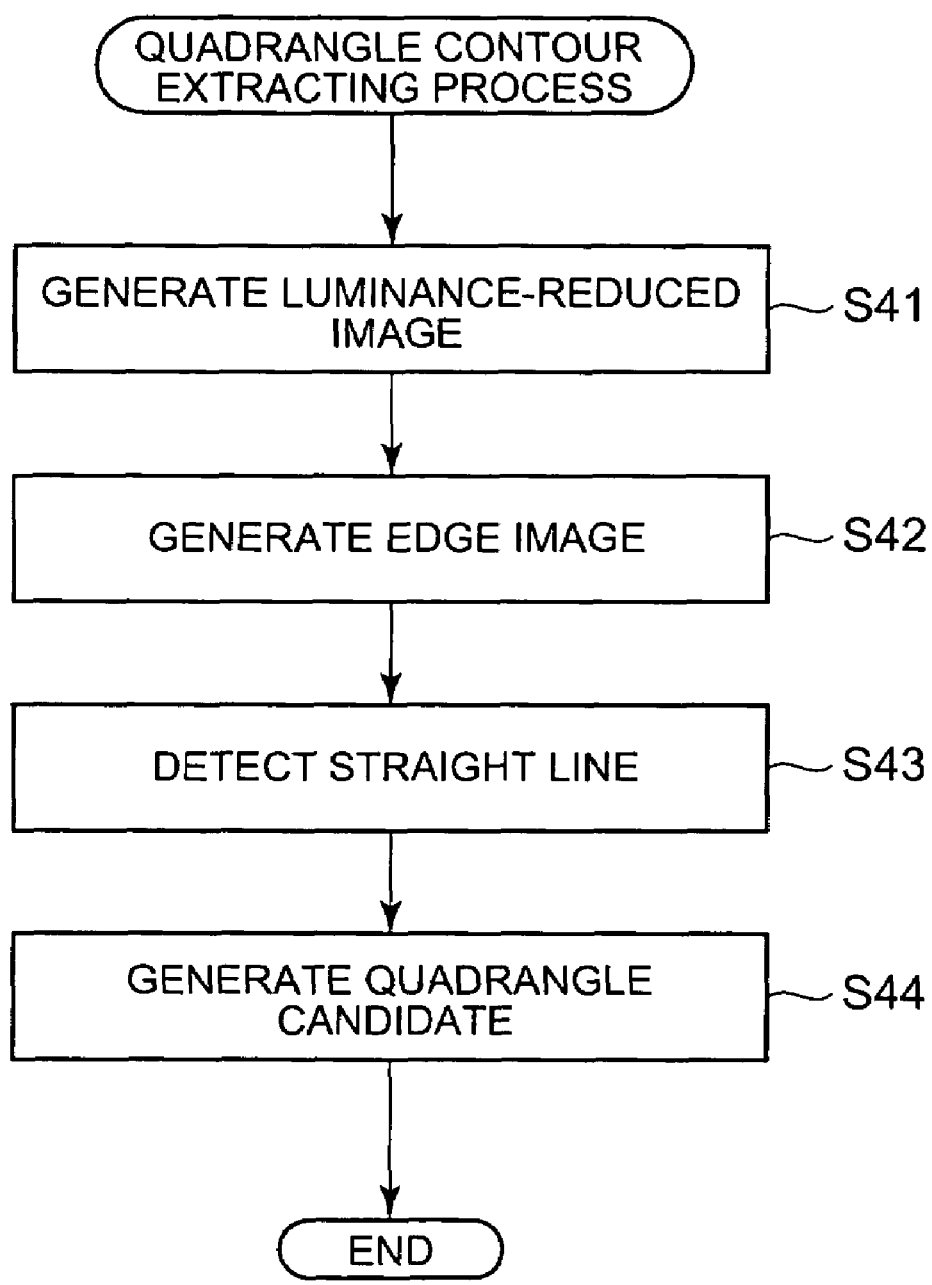

REDUCED LUMINANCE IMAGE

EDGE IMAGE

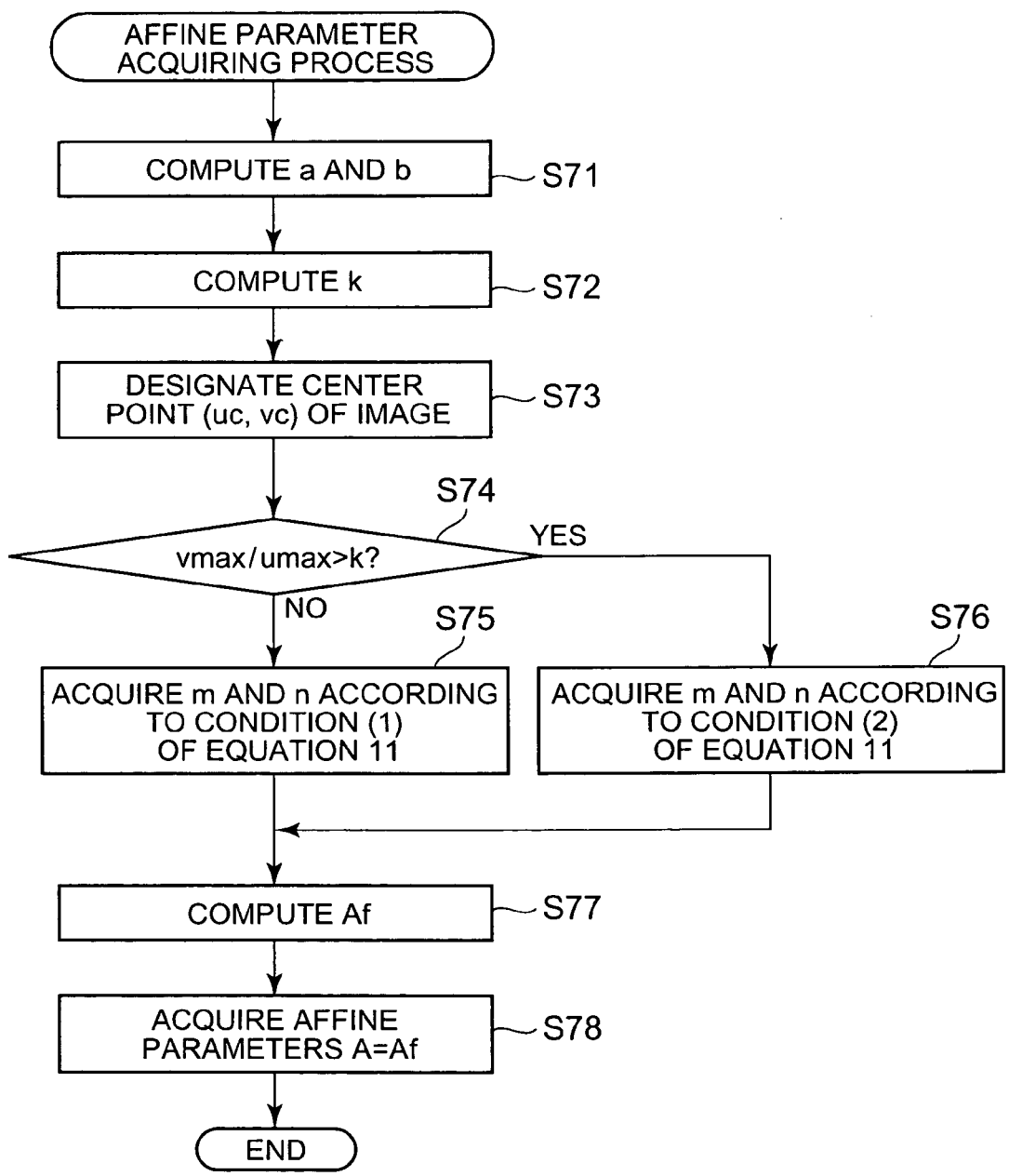

WARNING STATEMENT

CAMERA SHOOTING SETTING MODE

FIG. 30

| DATA NAME | NUMBER OF BYTES | CONTENTS OR SUPPLEMENT |
|---|---|---|
| FILE NAME OF ORIGINAL IMAGE | MAXIMUM OF 128 BYTES | STORE FILE NAME OF ORIGINAL IMAGE NULL AT THE END OF FILE NAME |
| IMAGE SIZE | 4 BYTES | VERTICAL (2 BYTES), HORIZONTAL (2 BYTES) |
| PROJECTION PARAMETERS | 32 BYTES | AFFINE PARAMETERS (a11,a12,a13,a21,a22,a23,a31,a32) |
| PARAMETERS FOR IMAGE EFFECT PROCESS | M*2 BYTES | DATA SETS OF INPUT /OUTPUT DATA (m SETS) |

FIG. 32

| DATA NAME | NUMBER OF BYTES | CONTENTS OR SUPPLEMENT |
|---|---|---|
| IMAGE SIZE | 4 BYTES | VERTICAL (2 BYTES), HORIZONTAL (2 BYTES) |
| PROJECTION PARAMETERS | 32 BYTES | AFFINE PARAMETERS (a11,a12,a13,a21,a22,a23,a31,a32) |
| PARAMETERS FOR IMAGE EFFECT CORRECTION | M*2 BYTES | DATA SETS OF INPUT /OUTPUT DATA (m SETS) |

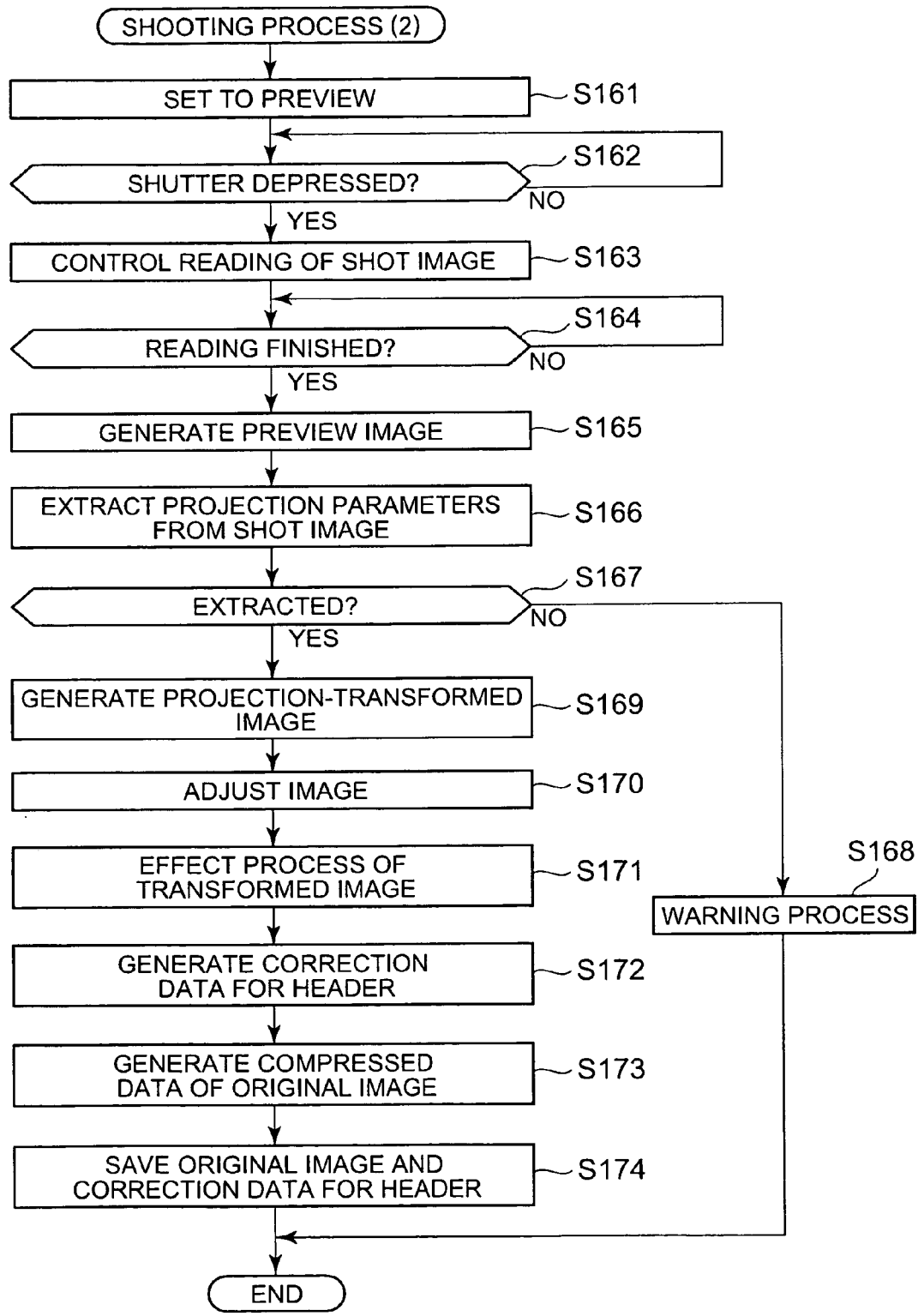

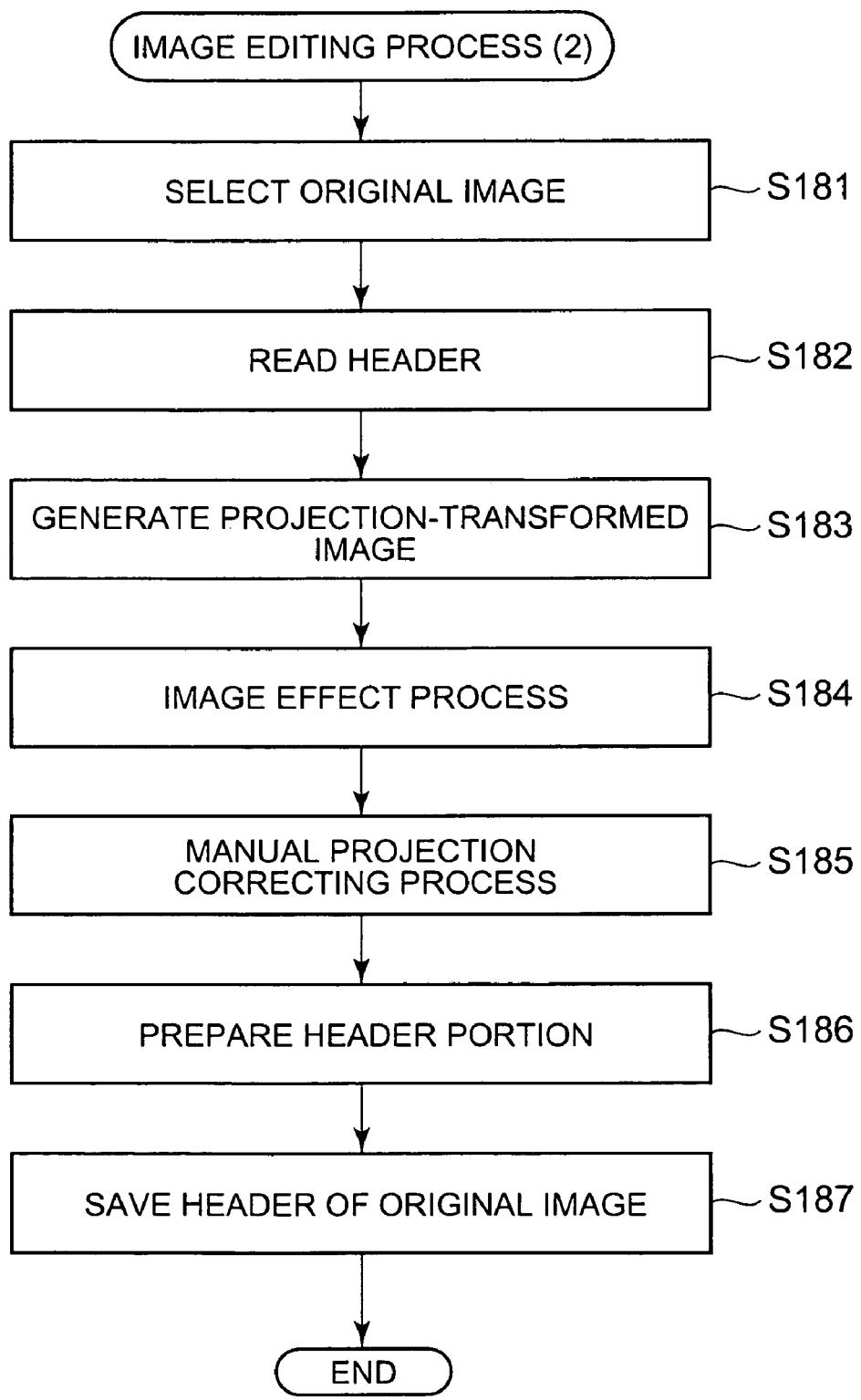

IMAGING APPARATUS AND IMAGE PROCESSING METHOD THEREFOR

BACKGROUND OF THE INVENTION

1. Field of the Invention

The present invention relates to an imaging apparatus, and an image processing method and a program for the imaging apparatus.

2. Description of the Related Art

With advancement of digital cameras and cost reduction of storage type memories, studies have been made on applications in which digital cameras are not only used to shoot scenes and persons, but also shoot documents, such as papers and name cards, or what is written on a blackboard or so in a meeting, and digitally save those images in a personal computer or so for management.

In shooting a document or a blackboard, it is desirable to image a subject to be shot (hereinafter referred to as "shooting target") from the front and perpendicularly. In shooting a blackboard, it may be difficult to image the blackboard from the front depending on the position of the photographer. Even if one can photograph a blackboard, there may be a case where it is preferable to avoid shooting from the front because of reflection of light. When a shooting target such as a document is shot obliquely, characters or the like are distorted obliquely or in a trapezoidal shape. Of course, those characters may be readable. Even if characters are readable, it is weary to actually read them. Because of image distortion, it is difficult to reuse those images.

There are several solutions proposed to overcome this shortcoming.

The first one is a system corrects a distorted image by using two images having a parallax (see Unexamined Japanese Patent Application KOKAI Publication No. 2001-134751, for example).

The second solution is a system which places an input image in a known fixed shape assumed, checks how the fixed shape is distorted to find transformation parameters to restore the shape to an original shape on a plane, and corrects distortion of the input image caused by tilting of a camera (see Unexamined Japanese Patent Application KOKAI Publication No. H3-94383, for example).

The third solution is a system which applies orthogonal grating to the surface of a subject to be photographed, images the subject, acquires the spatial coordinates of individual lattice points in the picked-up image, and projects the image after orthogonal transformation to a coordinate system provided on the shooting surface, thereby correcting image distortion (see Unexamined Japanese Patent Application KOKAI Publication No. H5-101221, for example).

The fourth solution is a system which is provided with an angle setting unit which inputs an angle of inclination defined by the shooting surface of a camera and the surface of a subject, and a range finding unit which measures the distance to the subject, and images the subject surface in a state corresponding to the angle of inclination input using the angle setting unit, thereby correcting an image picked up in such a way as to match with the image of the subject as seen from the front, based on the input angle of inclination and the distance to the subject surface (see Unexamined Japanese Patent Application KOKAI Publication No. H9-289600, for example).

The fifth solution is a system which corrects distortion of an image caused by tilting of a camera based on information on the direction of the camera fixed to the rotational axis in such a way that a geometrical shape of a shooting target is reproduced correctly (see Unexamined Japanese Patent Application KOKAI Publication No. H 11-98485, for example).

The sixth solution is a system which generates four (upper right, upper left, lower right and lower left) partial images of an input image, forms a trapezium based on the inclinations of the partial images, performs tilting and rotating transformation in such a way that two opposite horizontal sides of the trapezium become parallel to each other to thereby acquire a horizontal tilt angle $\alpha$, and then acquires an angle defined between a straight line which crosses the two parallel sides and the vertical direction as a skew rotational angle $\beta$.

A vertical tilt angle $\gamma$ is obtained by performing tilting and rotating transformation in the vertical direction in such a way that the remaining two opposite sides of the trapezium become parallel to each other. Then, geometrical transformation is performed on the input image by using the horizontal tilt angle $\alpha$, the skew rotational angle $\beta$ and the vertical tilt angle $\beta$, thereby correcting the distorted image (see Unexamined Japanese Patent Application KOKAI Publication No. 2000-341501, for example).

Preparation of two images having a parallax as done in the system described in Unexamined Japanese Patent Application KOKAI Publication No. 2001-134751 is very troublesome because pictures should be taken from two locations with a camera comprising a single lens.

As the system described in Unexamined Japanese Patent Application KOKAI Publication No. H3-94383 needs to place a shooting target in a fixed figure of a known shape, it requires a troublesome work to photograph, for example, the surface of a sheet as the shooting target.

As the system described in Unexamined Japanese Patent Application KOKAI Publication No. H5-101221 requires a work of overlaying the orthogonal grating onto the subject surface and manually inputting two-dimensional coordinates of individual lattice points, thus making it difficult to photograph the subject surface in a simple operation.

In the system described in Unexamined Japanese Patent Application KOKAI Publication No. H9-289600, it is very difficult to manually and accurately input the angle of inclination defined between the shooting surface and the subject surface by manipulating the angle setting unit. This makes it difficult to correct tilting-originated distortion of an image with a high accuracy.

In the system described in Unexamined Japanese Patent Application KOKAI Publication No. H11-98485, the distance and the angle of inclination between the surface of the original and the shooting surface are determined by the mechanical structure and layout of the camera and the camera should be fixed at a given height and set in such a way as to be rotatable about the rotational axis. This inevitably enlarges the system size and increases the manufacturing cost.

As the system described in Unexamined Japanese Patent Application KOKAI Publication No. 2000-341501 should perform multiple rotational transformations, increasing the number of arithmetic operations which requires an expensive computing device. In addition, the system takes a longer processing time.

The present invention has been made to overcome the conventional problems, and aims at providing an imaging apparatus capable of easily correcting the image of a shooting target, and an image processing method and a program for the imaging apparatus.

SUMMARY OF THE INVENTION

According to the first aspect of the invention, there is provided an imaging apparatus which images a shooting target, and comprises:

an imaging unit which shoots the shooting target; and an image processing unit which performs image processing on an image of the shooting target, acquired by shooting done by the imaging unit, in such a way as to correct distortion of the image of the shooting target.

The image processing unit includes a shape acquisition unit which acquires a contour of the image of the shooting target from that image and acquires a shape of the image from the acquired contour, a projection parameter acquisition unit which acquires projection parameters indicating a relationship between the image of the shooting target and a real shooting target from vertex positions of the image of the shooting target by associating the shape of the image acquired by the shape acquisition unit with a shape of the real shooting target, and an image transformation unit which performs image transformation of the image of the shooting target by using the projection parameters acquired by the projection parameter acquisition unit.

According to the second aspect of the invention, there is provided an image processing apparatus which corrects distortion of an image of an original acquired by shooting, and comprises:

a shape acquisition unit which acquires a contour of the image of the original from the image of the original and acquires a shape of the image of the original from the acquired contour;

a projection parameter acquisition unit which acquires projection parameters indicating a relationship between the shape of the image of the original and a shape of a real original from the shape of the image of the original acquired by the shape acquisition unit; and an image transformation unit which performs image transformation of the image of the original by using the projection parameters acquired by the projection parameter acquisition unit.

According to the third aspect of the invention, there is provided an image processing method which performs image processing on an image of a shooting target, acquired by imaging the shooting target, in such a way as to correct distortion of the image of the shooting target, and comprises:

a step at which a contour of the image of the shooting target is acquired from the image of the shooting target and a shape of the image is acquired from the acquired contour;

a step at which projection parameters indicating a relationship between the image of the shooting target and a real shooting target are acquired from vertex positions of the image of the shooting target by associating the acquired shape of the image with a shape of the real shooting target; and a step at which image transformation is performed on the image by using the acquired projection parameters.

According to the fourth aspect of the invention, there is provided a recording medium having stored a program for allowing a computer to execute:

a procedure of acquiring a contour of an image of a shooting target from the image of the shooting target, acquired by shooting the shooting target, and acquiring a shape of the image of the shooting target from the acquired contour;

a procedure of acquiring projection parameters indicating a relationship between the image of the shooting target and a real shooting target from vertex positions of the image of the shooting target by associating the acquired shape of the image with a shape of the real shooting target; and a procedure of performing image transformation of the image in such a way as to correct distortion of the image of the shooting target by using the acquired projection parameters.

The invention can easily correct the image of a shooting target.

BRIEF DESCRIPTION OF THE DRAWINGS

These objects and other objects and advantages of the present invention will become more apparent upon reading of the following detailed description and the accompanying drawings in which:

FIG. 4 is an explanatory diagram of individual keys of an operation unit;

FIG. 9 is a flowchart illustrating the contents of a quadrangle contour extracting process which is executed by the image processing apparatus shown in FIG. 2;

FIGS. 11A and 11B are explanatory diagrams of the function of a Roberts filter;

FIG. 17 is a flowchart illustrating the contents of a process of acquiring affine parameters, which is executed by the image processing apparatus shown in FIG. 2;

FIG. 30 is an explanatory diagram showing the contents of header information;

FIG. 32 is an explanatory diagram showing the contents of header information when only an original image is saved;

FIG. 33 is a flowchart illustrating the contents of a shooting process (2), which is executed by the CPU and the image processing apparatus shown in FIG. 2 when only an original image is saved; and FIG. 34 is a flowchart illustrating the contents of the corrected-image re-editing process, which is executed by the CPU and the image processing apparatus shown in FIG. 2 when only an original image is saved.

DETAILED DESCRIPTION OF THE PREFERRED EMBODIMENT

An imaging apparatus according to one embodiment of the invention will be described below with reference to the accompanying drawings.

In the following description of the embodiment, an imaging apparatus will be described as a digital camera.

Figure 1:
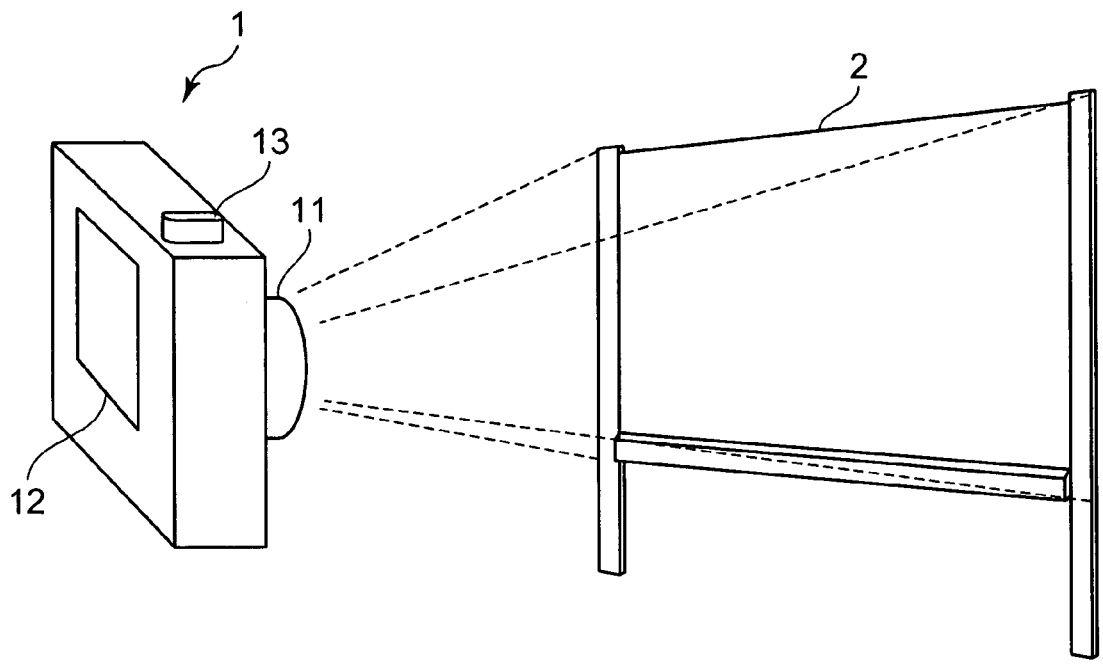
FIG. 1 is an explanatory diagram showing a state where a whiteboard is shot by a digital camera according to one embodiment of the invention.

FIG. 1 shows the structure of a digital camera 1 according to the embodiment.

The digital camera 1 according to the embodiment shoots characters, figures, pictures or the like on a whiteboard 2 or so as a shooting target, detects image distortion from an image acquired by the shooting and corrects the distortion, thereby generating an image which looks as if photographed from the front. The digital camera 1 has an imaging lens section 11, a liquid crystal monitor 12 and a shutter button 13.

The imaging lens section 11 has a lens or so for condensing light, and condenses light from characters, figures, pictures or the like on the whiteboard 2 or so.

The liquid crystal monitor 12 displays an image taken inside via the imaging lens section 11.

The shutter button 13 is depressed when shooting a shooting target.

Figure 2:
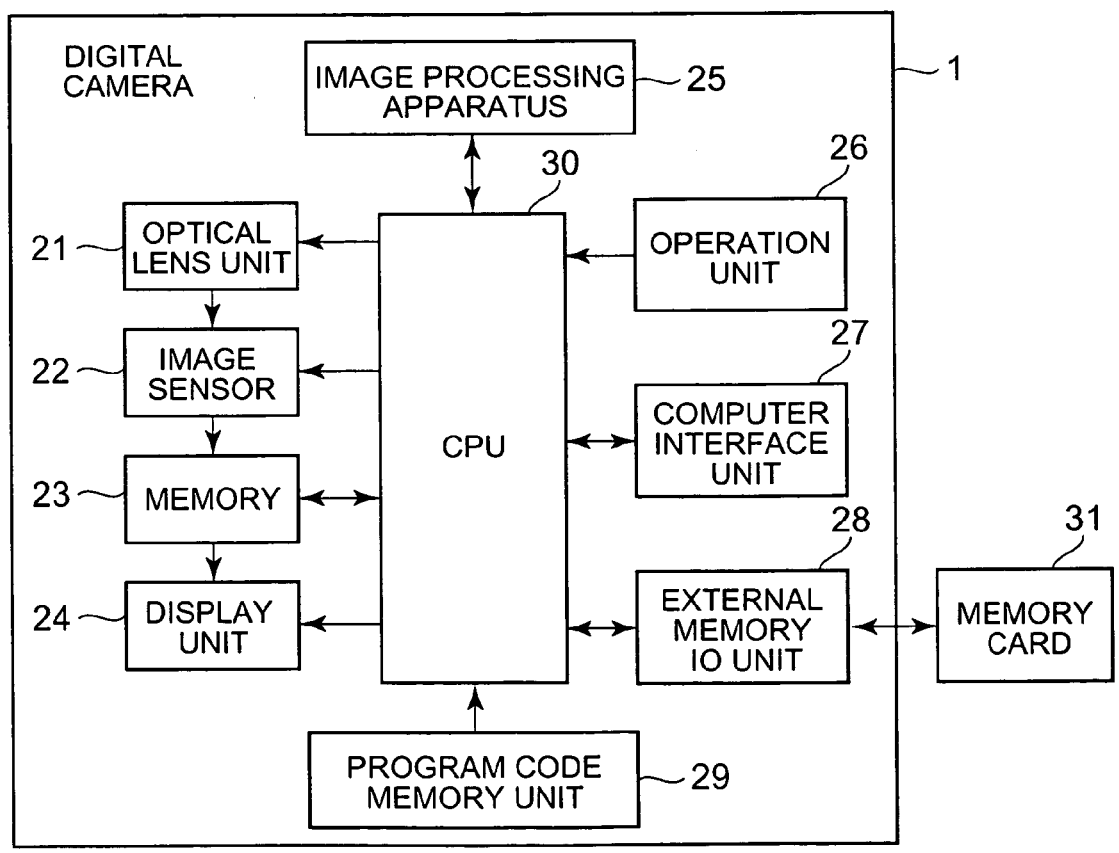
FIG. 2 is a block diagram showing the structure of the digital camera shown in FIG. 1.

As shown in FIG. 2, the digital camera 1 further includes an optical lens unit 21, an image sensor 22, a memory 23, a display unit 24, an image processing apparatus 25, an operation unit 26, a computer interface unit 27, an external memory IO unit 28, and a program code memory unit 29.

The optical lens unit 21 has the imaging lens section 11 and a drive unit for the imaging lens section 11, and forms an, image on the image sensor 22 by condensing light from characters, figures, pictures or the like on the whiteboard 2 or so.

The image sensor 22 acquires the formed image as digital image data, and is comprised of a CCD or so. The image sensor 22 is controlled by a CPU 30. When the shutter button 13 is not depressed, the image sensor 22 generates digital image data with a low resolution for preview and sends the image data to the memory 23 regularly at intervals of 30 seconds or so. When the shutter button 13 is depressed, the image sensor 22 generates digital image data with a high resolution and sends the image data to the memory 23.

The memory 23 temporarily stores a low-resolution preview image, high-resolution image data or data of an original image to be undergone in the image processing apparatus 25 or image data after image processing. The memory 23 sends image data temporarily stored to the display unit 24 or the image processing apparatus 25.

The display unit 24 has the liquid crystal monitor 12 and displays an image on the liquid crystal monitor 12. The display unit 24 displays a low-resolution preview image or a high-resolution image, temporarily stored in the memory 23, on the liquid crystal monitor 12.

The image processing apparatus 25 performs image processing, such as compression of image data, correction of image distortion and an image effect process, on image data temporarily stored in the memory 23.

Figure 3A:
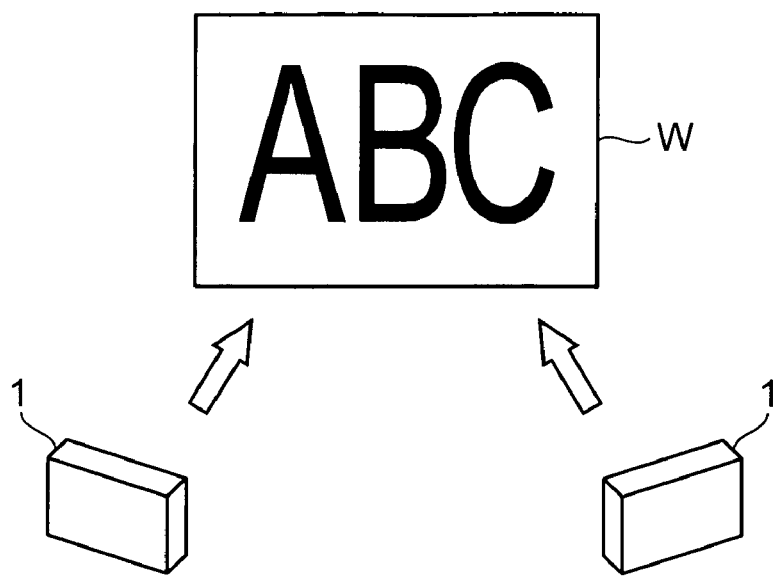
FIGS. 3A to 3D are explanatory diagrams of the functions of an image processing apparatus shown in FIG. 2.
Figure 3B:
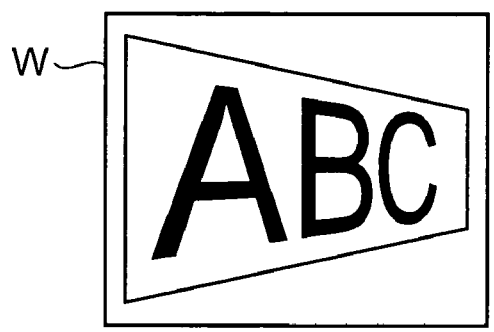
Figure 3C:
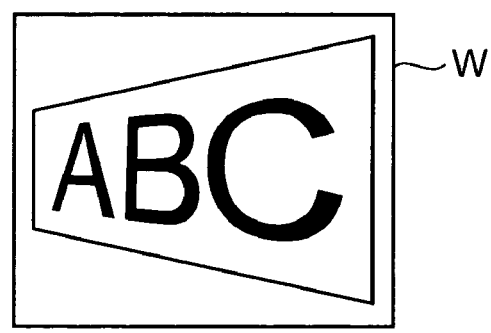
Figure 3D:
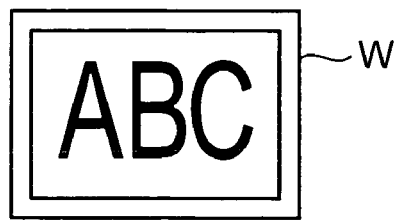

When the digital camera 1 images characters, figures, pictures or the like on the whiteboard 2 from the left direction or right direction as shown in FIG. 3A, the image of the characters or the like on the whiteboard 2 is displayed distorted on the liquid crystal monitor 12, as shown in FIG. 3B or FIG. 3C. The image processing apparatus 25 performs image processing on the image as shown in FIG. 3B or 3C to generate an image as if photographed from the front as shown in FIG. 3D.

To correct image distortion, the image processing apparatus 25 extracts a quadrangle from the distorted image and performs projection transformation of the picked-up image on the extracted quadrangle.

More specifically, the image processing apparatus 25 mainly performs the following processes under the control of the CPU 30.

(1) Extraction of affine parameters from the picked-up image
(2) Image conversion using the extracted affine parameters
(3) Adjustment of image transformation
(4) Extraction of image effect correction parameters about luminance or parallax or so and image effect process
Those processes will be discussed later.

The operation unit 26 has switches and keys for controlling the function of document projection. When a user depresses any of those keys and switches, the operation unit 26 sends operation information associated with the depressed key or switch to the CPU 30 in response to the depression.

The image processing apparatus 25 has an upper reduction key 111, a lower reduction key 112, a right reduction key 113, a left reduction key 114, a rightward rotation key 115 and a leftward rotation key 116 as shown in FIG. 4

The upper reduction key 111, the lower reduction key 112, the right reduction key 113 and the left reduction key 114 are projection transformation keys for performing projection transformation. The upper reduction key 111 is depressed to rotate the upper portion of an image downward toward the sheet surface when the upper portion of the image is larger than the lower portion about the X axis.

The lower reduction key 112 is depressed to rotate the lower portion of an image downward toward the sheet surface when the lower portion of the image is larger than the upper portion about the X axis.

The right reduction key 113 and the left reduction key 114 are depressed to adjust right and left distortions about the Y axis. Specifically, the right reduction key 113 is depressed when the right-hand side is greater than the left-hand side, and the left reduction key 114 is depressed when the left-hand side is greater than the right-hand side.

The rightward rotation key 115 and the leftward rotation key 116 are rotation correction keys which are depressed to adjust rotation of an image. Specifically, the rightward rotation key 115 is depressed to rotate an image rightward, and the leftward rotation key 116 is depressed to rotate an image leftward.

The operation unit 26 has a shooting key, a playback key, cursor keys, a control key, etc. (not shown) in addition to the aforementioned keys. The shooting key is for selecting the shooting mode when shooting a shooting target. The playback key is for selecting the playback mode when reproduce the picked-up image of the shooting target. The control key has functions of various keys including a YES key for settling an operation, a NO key for canceling an operation, and an edition key for making edition.

The computer interface unit 27 operates as a USB storage class driver when the digital camera 1 is connected to a computer (not shown). Accordingly, when connected to the digital camera 1, the computer uses a memory card 31 as an external memory device for the computer.

The external memory IO unit 28 inputs and outputs image data or so to and from the memory card 31. The memory card 31 stores image data or so supplied from the external memory IO unit 28.

The program code memory unit 29 stores a program which is run by the CPU 30, and is comprised of a ROM or the like.

The CPU 30 controls the entire system according to the program stored in the program code memory unit 29. The memory 23 is also used as a work memory for the CPU 30.

When operation information is sent to the CPU 30 from the operation unit 26 as a result of depressing any of the switches and keys, the CPU 30 controls the image sensor 22, the memory 23, the display unit 24, the image processing apparatus 25 and so forth based on the operation information.

Specifically, when operation information indicating depression of the shooting key is sent from the operation unit 26, the CPU 30 sets the individual units to the shooting mode. With the shooting mode set, when the shutter button 13 is not depressed, the CPU 30 sets the image sensor 22 to a preview mode, and when the shutter button 13 is depressed, the CPU 30 sets the image sensor 22 to a high-resolution mode to read the high-resolution image of the shooting target. When operation information indicating depression of the playback key is sent to the CPU 30, the CPU 30 sets the individual units to the playback mode.

When operation information indicating depression of any of the projection transformation keys or any of the rotation correction keys is sent from the operation unit 26, the CPU 30 sends the operation information to the image processing apparatus 25 and controls the image processing apparatus 25.

The CPU 30 writes data of a preview image and a high-resolution image in the memory card 31 and reads written image data from the memory card 31 via the external memory IO unit 28. The CPU 30 writes image data compressed in, for example, the JPEG format in the memory card 31.

At the time of temporarily storing image data in the memory 23, the CPU 30 writes data of a preview image and a high-resolution image in different memory areas. The CPU 30 writes image data in image files in the memory card 31, and writes header information about image data in a header information memory area in the associated image file at the time of writing the image data.

The operation of the digital camera 1 according to the embodiment will be described next.

When a user powers on the digital camera 1, the CPU 30 acquires data of the program stored in the program code memory unit 29. When the user depresses the shooting key, the operation unit 26 sends its operation information to the CPU 30. The CPU 30 receives the operation information, and the CPU 30, the image processing apparatus 25, etc. execute a shooting process according to a flowchart illustrated in FIG. 5.

The CPU 30 sets the image sensor 22 to the preview mode (step S11).

Based on the operation information sent from the image processing apparatus 25, the CPU 30 determines whether the shutter button 13 is depressed or not (step S12).

When it is determined that the shutter button 13 is depressed (YES at step S12), the CPU 30 changes the preview mode of the image sensor 22 to the high-resolution mode and controls the image sensor 22 accordingly (step S13).

The CPU 30 writes data of the high-resolution image of a shooting target generated by the image sensor 22 in a memory area in the memory 23 different from a memory area for a preview image (step S14).

The CPU 30 determines whether reading of image data has been completed or not (step S15).

When it is determined that reading has not been completed (NO at step S15), the CPU 30 controls the image sensor 22 to continue reading image data.

When it is determined that every image data has been read and image transfer has been finished (YES at step S15), the CPU 30 generates a low-resolution preview image from the picked-up image (high-resolution image) and writes data of the preview image in the preview-image memory area in the memory 23 (step S16).

The CPU 30 controls the image processing apparatus 25 in such a way as to generate compressed data, and the image processing apparatus 25 generates compressed data (step S17).

The CPU 30 writes and saves the compressed data generated by the image processing apparatus 25 in the memory card 31 via the external memory IO unit 28 (step S18).

Next, the operation unit 26 extracts projection parameters for form a front image from the picked-up image under the control of the CPU 30 (step S19).

The CPU 30 determines whether the image processing apparatus 25 could extract projection parameters or not (step S20).

When the CPU 30 has decided that extraction could be done (YES at step S20), the image processing apparatus 25 creates a projection transformation image based on the extracted projection parameters (step S21).

When any of the projection transformation keys and the rotation correction keys of the operation unit 26 is depressed, the operation unit 26 sends their operation information to the CPU 30. The CPU 30 sends the operation information from the operation unit 26 to the image processing apparatus 25, which in turn performs adjustment of image transformation according to the sent operation information (step S22).

The image processing apparatus 25 extracts image effect correction parameters (step S23) and executes an image effect process (step S24).

The image processing apparatus 25 performs compression on image data which has undergone the image effect process, thereby generating compressed data (step S25).

The image processing apparatus 25 writes the generated compressed data in the memory card 31 (step S26).

When it is determined that extraction could not be done (NO at step S20), on the other hand, the CPU 30 performs a warning process (step S27).

The CPU 30, etc. finish the shooting process in the above manner. The CPU 30, etc. repetitively executes the shooting process as long as the user operates some key.

Next, the shooting process which is executed by the image processing apparatus 25 will be described.

To begin with, the basic concept (method of achieving affine transformation) of affine transformation to be used in image processing by the image processing apparatus 25 will be explained.

After transformation is widely used in spatial transformation of images. In the embodiment, projection transformation is carried out by using two-dimensional affine transformation without using three-dimensional camera parameters. Accordingly, points of coordinates (u, v) before transformation are associated with post-transformation coordinates (x, y) through transformation, such as movement, size magnification or reduction, or rotation by an equation 1 below. Projective transformation can be carried out by this affine transformation.

$$(x', y', z') = (u, v, 1)\begin{pmatrix} a_{11} & a_{12} & a_{13} \\ a_{21} & a_{22} & a_{23} \\ a_{31} & a_{32} & a_{33} \end{pmatrix} \quad \text{Equation 1}$$

The final coordinates (x, y) are computed from the following equation 2.

$$x = \frac{x'}{z'} = \frac{a_{11}u + a_{21}v + a_{31}}{a_{13}u + a_{23}v + a_{33}} \quad \text{Equation 2}$$
$$y = \frac{y'}{z'} = \frac{a_{12}u + a_{22}v + a_{32}}{a_{13}u + a_{23}v + a_{33}}$$

The equation 2 is for projection transformation, and the coordinates (x, y) are reduced toward O according to the value of z'. That is, parameters included in z' influence projection. The parameters are $a_{13}$, $a_{23}$ and $a_{33}$. As the other parameters can be normalized with the parameter $a_{33}$, $a_{33}$ may be set to 1.

Figure 6:
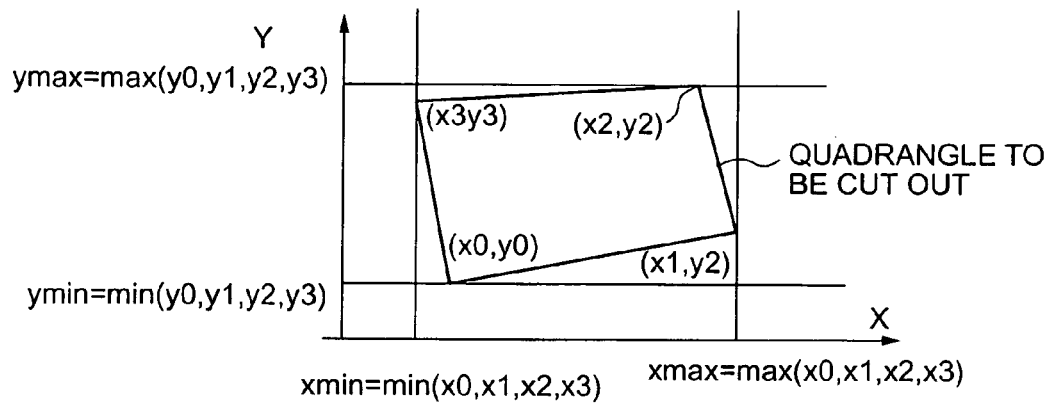
FIG. 6 is an explanatory diagram showing a quadrangle to be extracted by the image processing apparatus shown in FIG. 2.

FIG. 6 shows the coordinates of individual vertexes of a rectangular picked-up image. The relationship between the quadrangle sensed by the digital camera 1 and the shooting target (whiteboard 2) will be described referring to FIG. 7.

Figure 7:
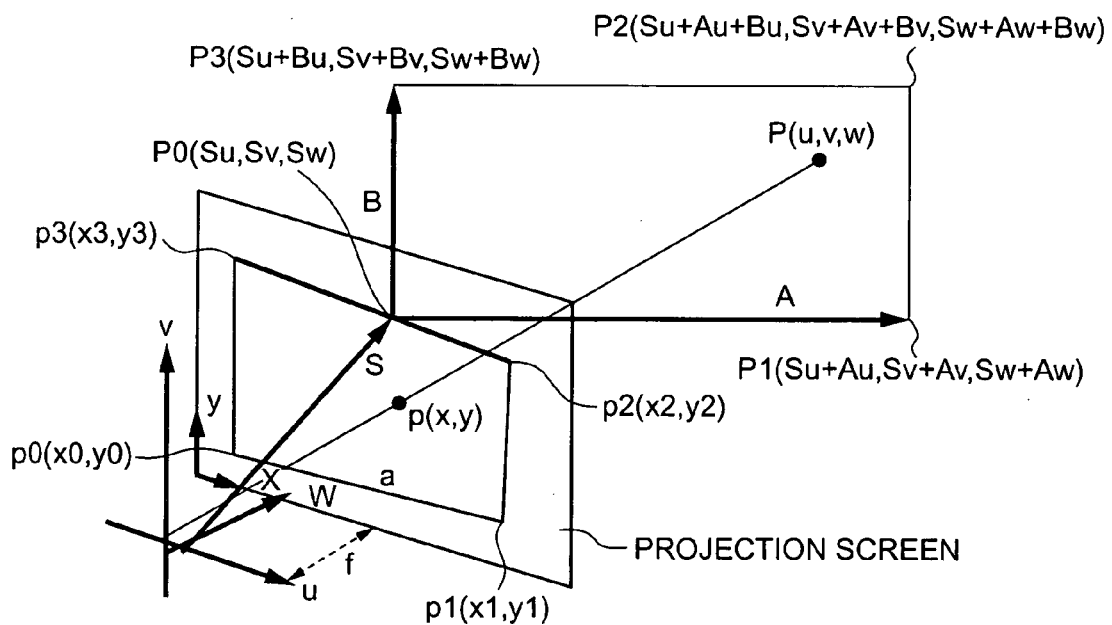
FIG. 7 is a diagram for explaining the basic concept of extraction of projection parameters and affine transformation.

In FIG. 7, the U-V-W coordinate system is the three-dimensional coordinate system of an image sensed by the digital camera 1. A vector A (Au, Av, Aw) and a vector B (Bu, Bv, Bw) represent the shooting target in the three-dimensional coordinate system U-V-W by vectors.

A vector S (Su, Sv, Sw) indicates a distance between the origin of the three-dimensional coordinate system U-V-W and the shooting target.

The image of the shooting target is projected onto a projection screen shown in FIG. 7.

Given that x, y is the coordinate system on the projection screen, an image to be projected onto the projection screen can be considered as an image to be sensed by the digital camera 1. The projection screen is positioned vertically apart from the W axis by a distance f. Given that there is a point at which a straight line connecting an arbitrary point (u, v, w) of the shooting target and the origin crosses the projection screen, let p(x, y) be the X-Y coordinates of that point of intersection. At this time, the coordinates p are given by the following equation 3 through projection transformation.

$$\begin{cases} x = u\frac{f}{w} \\ y = v\frac{f}{w} \end{cases} \quad \text{Equation 3}$$

The relationship that is given by the following equation 4 is acquired from the equation 3 and the relationship between points P0, P1, P2 and P3 and projection points p0, p1, p2 and p3 onto the projection screen as shown in FIG. 7.

$$\begin{cases} Su = k1 \cdot x0 \\ Sv = k1 \cdot y0 \\ Sw = k1 \cdot f \end{cases} \quad \text{Equation 4}$$

$$\begin{cases} Au = k1 \cdot \{x1 - x0 + \alpha \cdot x1\} \\ Av = k1 \cdot \{y1 - y0 + \alpha \cdot y1\} \\ Aw = k1 \cdot \alpha \cdot f \end{cases}$$

$$\begin{cases} Bu = k1 \cdot \{x3 - x0 + \beta \cdot x3\} \\ Bv = k1 \cdot \{y3 - y0 + \beta \cdot y3\} \\ Bw = k1 \cdot \beta \cdot f \end{cases}$$

where k1=Sw/f.

The projection coefficients $\alpha$ and $\beta$ are given by the following equation 5.

$$\alpha = \frac{(x0 - x1 + x2 - x3) \cdot (y3 - y2) - (x3 - x2) \cdot (y0 - y1 + y2 - y3)}{(x1 - x2) \cdot (y3 - y2) - (x3 - x2)(y1 - y2)} \quad \text{Equation 5}$$

$$\beta = \frac{(x1 - x2) \cdot (y0 - y1 + y2 - y3) - (x0 - x1 + x2 - x3) \cdot (y1 - y2)}{(x1 - x2) \cdot (y3 - y2) - (x3 - x2)(y1 - y2)}$$

Next, projection transformation will be discussed.

An arbitrary point P on the shooting target is expressed by the following equation 6 using the vectors S, A and B.

$$P = S + m \cdot A + n \cdot B \quad \text{Equation 6}$$

where m: the coefficient of the vector A ($0 \leq m \leq 1$), and
n: the coefficient of the vector B ($0 \leq n \leq 1$), Substituting the relational expression of the equation 4 to the equation 6, the coordinates x and y are expressed by the following equation 7.

$$\begin{cases} x = \dfrac{m \cdot (x1 - x0 + \alpha \cdot x1) + n \cdot (x3 - x0 + \beta \cdot x3) + x0}{1 + m \cdot \beta + n \cdot \alpha} \\ y = \dfrac{m \cdot (y1 - y0 + \alpha \cdot y1) + n \cdot (y3 - y0 + \beta \cdot y3) + y0}{1 + m \cdot \alpha + n \cdot \beta} \end{cases}$$ Equation 7

Expressing this relationship in terms of the equation of affine transformation, coordinates (x', y', z') are given by the following equation 8.

$$(x', y', z') = (m, n, 1) \begin{pmatrix} x1 - x0 + \alpha \cdot x1 & y1 - y0 + \alpha \cdot y1 & \alpha \\ x3 - x0 + \beta \cdot x3 & y3 - y0 + \beta \cdot y3 & \beta \\ x0 & y0 & 1 \end{pmatrix}$$ Equation 8

Substituting m and n into the equation 8 yields a corresponding point (x, y) of the picked-up image. As the corresponding point (x, y) should not necessarily be an integer, the value of a pixel should be acquired using image interpolation or the like.

There may be a scheme of previously giving an image size ($0 \leq u < u\text{max}$, $0 \leq v < v\text{max}$) in which a corrected image p(u, v) is output and adjusting the image according to the image size. According to the scheme, m and n are given the following equation 9.

$$m = \dfrac{u}{u\max}$$ Equation 9
$$n = \dfrac{v}{v\max}$$

However, the aspect ratio of the corrected image to be generated does not match with the aspect ratio of the shooting target. The relationship between the corrected image p(u, v) and the values of m and n is expressed by the following equation 10 from the equation 3.

$$k = \dfrac{|B|}{|A|} = \dfrac{\sqrt{(x3 - x0 + \beta \cdot x3)^2 + (y3 - y0 + \beta \cdot y3)^2 + (\beta f)^2}}{\sqrt{(x1 - x0 + \alpha \cdot x1)^2 + (y1 - y0 + \alpha \cdot y1)^2 + (\alpha f)^2}}$$ Equation 10

If the focal distance f of the lens, which is a camera parameter, is known, the aspect ratio k can be acquired. Given that the image size of the corrected image p(u, v) is ($0 \leq u < u\text{max}$, $0 \leq v < v\text{max}$), the same aspect ratio k as that of the shooting target can be acquired by obtaining m and n according to the following equation 11.

(1) when $v\max/u\max \leq k$  Equation 11
$$m = \dfrac{u}{v\max} \quad (0 \leq u < u\max)$$
$$n = \dfrac{v}{v\max}$$
(2) when $v\max/u\max > k$
$$m = \dfrac{u}{u\max} \quad (0 \leq v < v\max)$$

-continued
$$n = \dfrac{v}{u\max}$$

When the camera has a fixed focal point, the value of the focal distance f of the lens can be acquired beforehand. When there is a zoom lens or so, the value of the focal distance f of the lens changes according to the zoom magnification of the lens, so that provided that a table showing the relationship between the zoom magnification and the focal distance f of the lens is created and stored beforehand, projection transformation can be carried out by reading the focal distance f based on the zoom magnification and according to the equations 10 and 11.

Figure 5:
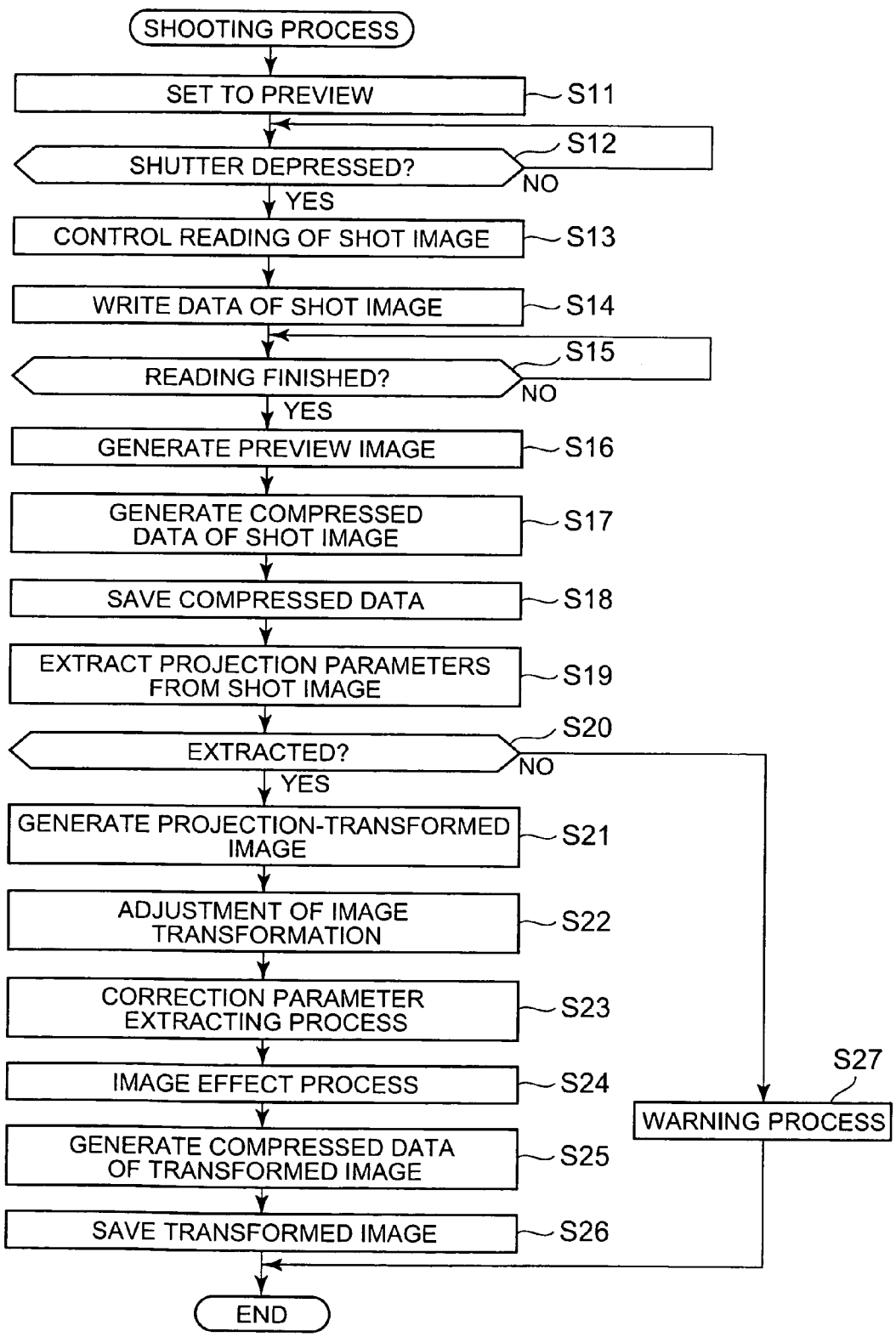
FIG. 5 is a flowchart illustrating the contents of a shooting process which is executed by the digital camera.

To execute such affine transformation, first, the image processing apparatus 25 extracts projection parameters from the image of the shooting target picked up (step S19 in FIG. 5).

The projection parameter extraction process that is executed by the image processing apparatus 25 will be discussed below referring to a flowchart illustrated in FIG. 8.

The image processing apparatus 25 extracts the coordinates (quadrangle contour) of four corners of the image of the shooting target from the picked-up image of the shooting target (step S31). The image processing apparatus 25 extracts the contour of the quadrangle as shown in a flowchart in FIG. 9.

That is, the image processing apparatus 25 generates a reduced-luminance image from the input image in order to reduce the number of arithmetic operations of image processing (step S41).

The image processing apparatus 25 produces an edge image of the shooting target from the generated reduced-luminance image (step S42).

The image processing apparatus 25 detects straight line parameters included in the edge image of the shooting target from that edge image (step S43).

The image processing apparatus 25 creates quadrangles to be candidates for forming the contour of the shooting target from the detected straight line parameters (step S44).

Figure 8:
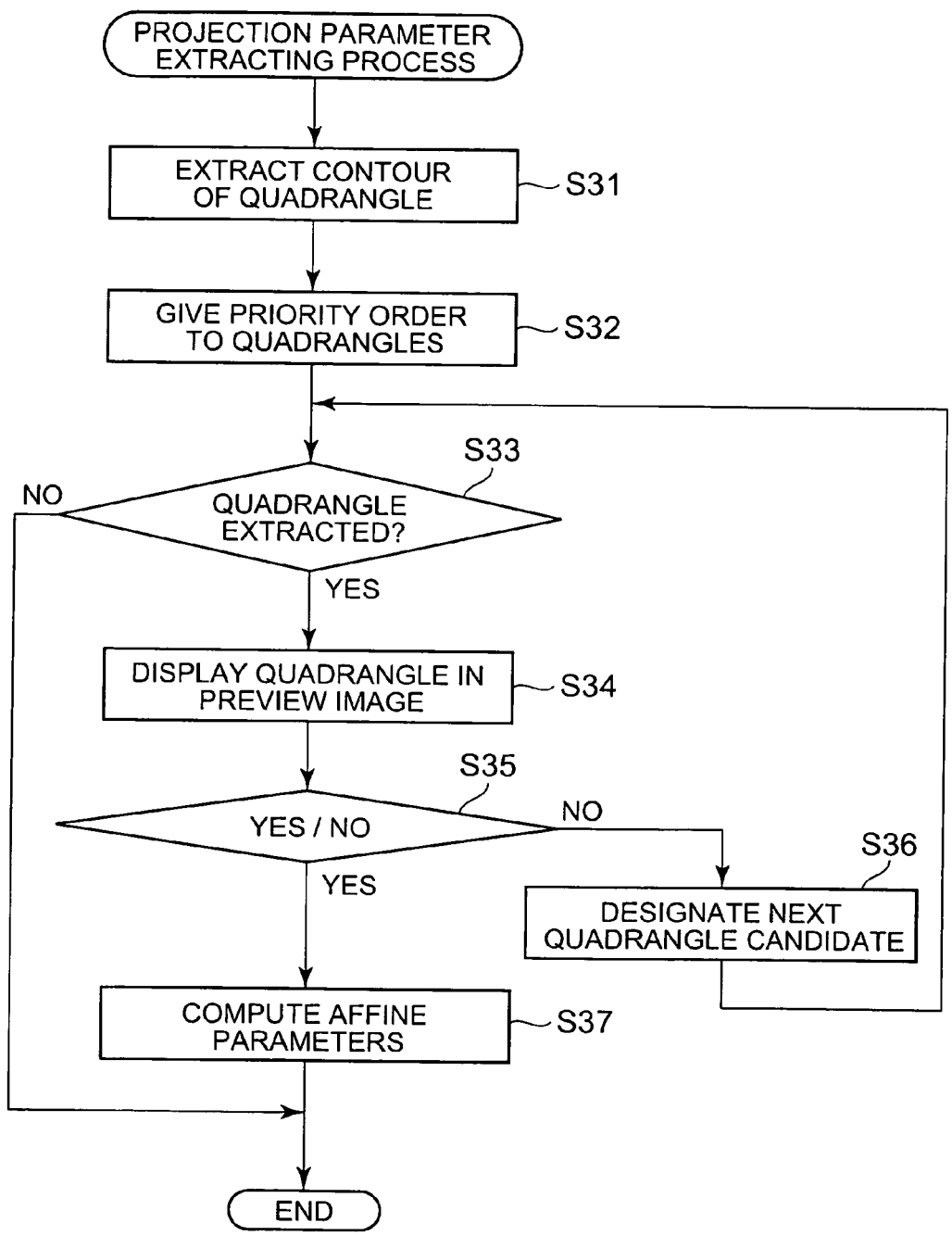
FIG. 8 is a flowchart illustrating the contents of a projection parameter extracting process which is executed by the image processing apparatus shown in FIG. 2.

The image processing apparatus 25 generates quadrangles to be candidates and gives the priority order to the generated quadrangles (step S32 in FIG. 8).

The image processing apparatus 25 selects a quadrangle according to the priority order, and determines whether the selected quadrangle could be extracted or not (step S33).

When it is determined that the selected quadrangle could not be extracted (NO at step S33), the CPU 30 terminates the projection parameter extraction process.

When it is determined that the quadrangle could be extracted (YES at step S33), on the other hand, the CPU 30 acquires the extracted quadrangle from the image processing apparatus 25, and sends the quadrangle to the display unit 24 to display a rectangular preview image on the liquid crystal monitor 12 (step S34).

The CPU 30 determines based on the operation information sent from the operation unit 26 which one of the YES key and the NO key has been depressed (step S35).

When the CPU 30 has decided that the NO key has been depressed (NO at step S35), the image processing apparatus 25 designates a next quadrangle candidate (step S36).

When the CPU 30 has decided that the YES key has been depressed (YES at step S35), on the other hand, the CPU 30 computes affine parameters from the vertexes of the extracted quadrangle (step S37).

Next, the projection parameter extraction process will be described more specifically.

Figure 10A:
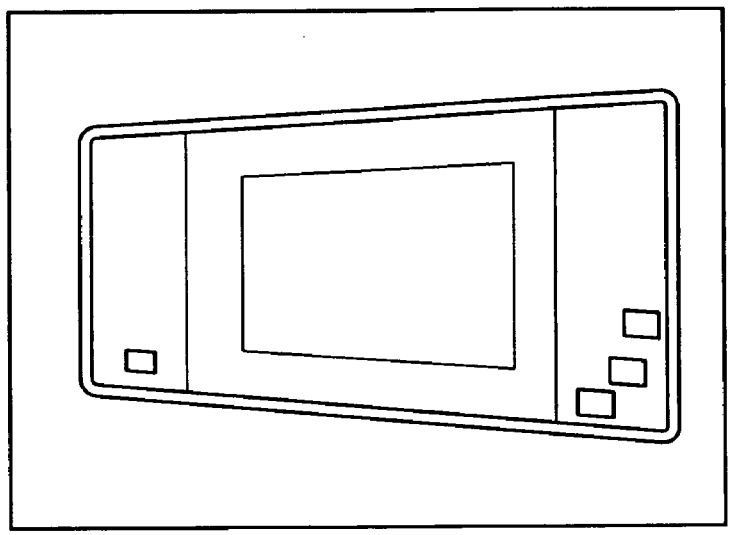
FIG. 10A is an explanatory diagram of a reduced-luminance image.
Figure 10B:
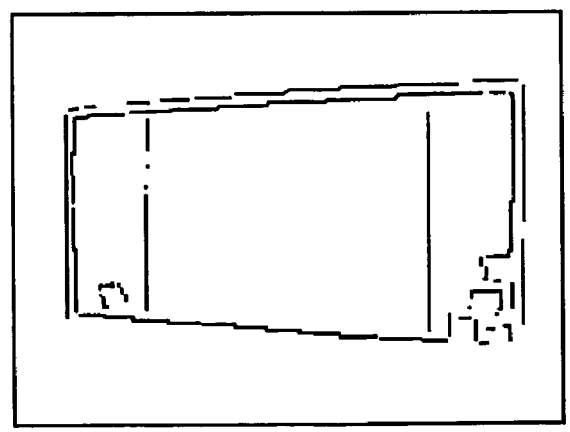
FIG. 10B is an explanatory diagram of an edge image.

FIG. 10A shows one example of a reduced-luminance image generated by the image processing apparatus 25 at step S41. The image processing apparatus 25 generates an edge image as shown in FIG. 10B from such a reduced-luminance image by using an edge detection filter called a Roberts filter (step S42). The Roberts filter detects the edges of an image by weighting two 4-neighborhood pixels to acquire two filters Δ1 and Δ2 and averaging the filters.

FIG. 11A shows the coefficient of the filter Δ1, and FIG. 11B shows the coefficient of the filter Δ2. Applying the coefficients of the two filters Δ1 and Δ2 to a pixel value f(x, y) of coordinates (x, y) of interest, pixel value g(x, y) after transformation is given by the following equation 12.

$$g(x, y) = \sqrt{(\Delta 1)^2 + (\Delta 2)^2}$$

$$\Delta 1 = 1 \cdot f(x, y) + 0 \cdot f(x+1, y) + 0 \cdot f(x, y-1) + 1 \cdot f(x+1, y-1)$$
$$= f(x, y) - f(x+1, y-1)$$

$$\Delta 2 = 0 \cdot f(x, y) + 1 \cdot f(x+1, y) - 1 \cdot f(x, y-1) + 0 \cdot f(x+1, y-1)$$
$$= f(x+1, y) - f(x, y-1)$$

Equation 12 where g(x, y): pixel value of coordinates (x, y) (after transformation), and f(x, y): pixel value of coordinates (x, y) (before transformation).

The edge image shown in FIG. 10B includes straight line parameters. The image processing apparatus 25 performs Radon transformation to detect the straight line parameters from the edge image (process at step S43).

The Radon transformation is integral transformation to associate n-th order data with (n−1)-th order projection data. Specifically, let us consider the r-θ coordinate system rotated by an angle θ from the x-y coordinate system, with image data being f(x, y) as shown in FIG. 12B. Image projection data p(r, θ) in the direction of θ is defined by the following equation 13.

$$p(r, \theta) = \int_{-\infty}^{\infty} f(r\cos\theta - s\sin\theta, r\sin\theta + s\cos\theta) ds$$
$$= \int_{-\infty}^{\infty}\int_{-\infty}^{\infty} f(x, y)\delta(x\cos\theta + y\sin\theta - r) dx dy$$

Equation 13 where δ( ): delta function of Dirac.

The transformation expressed by the equation 13 is called "Radon transformation".

Figure 12A:
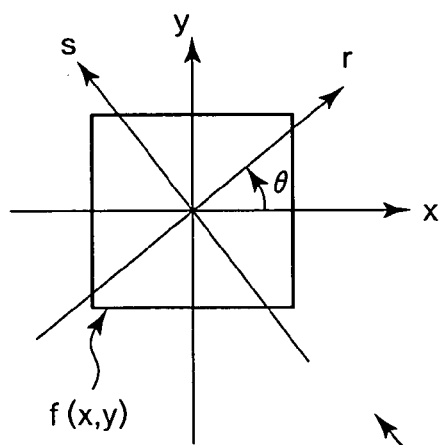
FIGS. 12A and 12B are image diagrams for explaining the principle of Radon transformation.
Figure 12B:
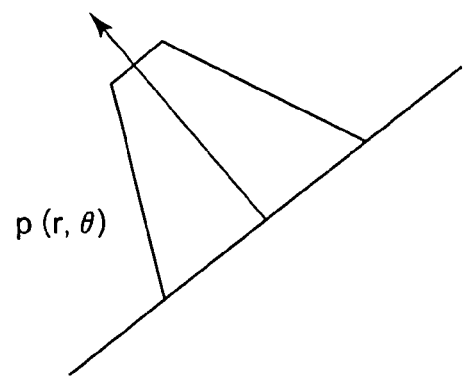

The image data f(x, y) as shown in FIG. 12A is transformed to the image projection data p(r, θ) as shown in FIG. 12B by Radon transformation.

Figure 13A:
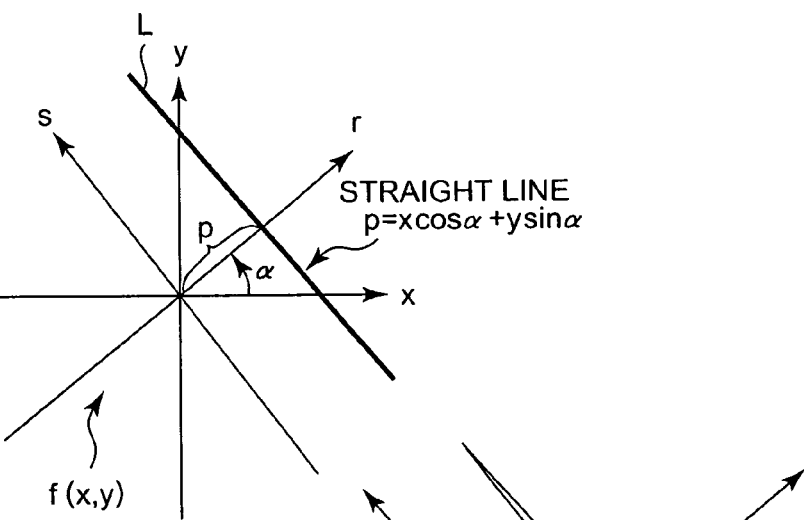
FIGS. 13A and 13B are diagrams for explaining an operation of acquiring data of the polar coordinate system by performing the Radon transformation on straight lines of the X, Y coordinate system.
Figure 13B:
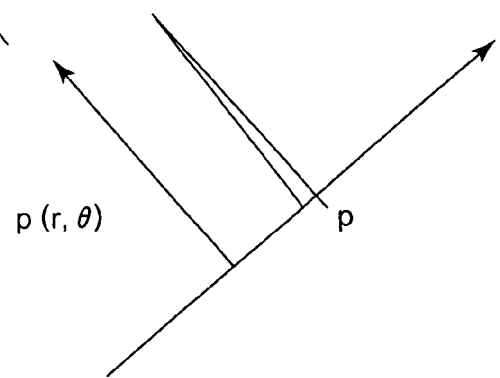

In such Radon transformation, a straight line L of the x-y coordinate system as shown in FIG. 13A is expressed by p=xcosα+ysinα in the polar coordinate system. As the straight line L is entire projected onto a point p(P, α), the straight line can be detected by detecting the peak of p(r, θ). Using this principle, the image processing apparatus 25 generates data p(r, θ) from the edge image through Radon transformation.

Figure 14:
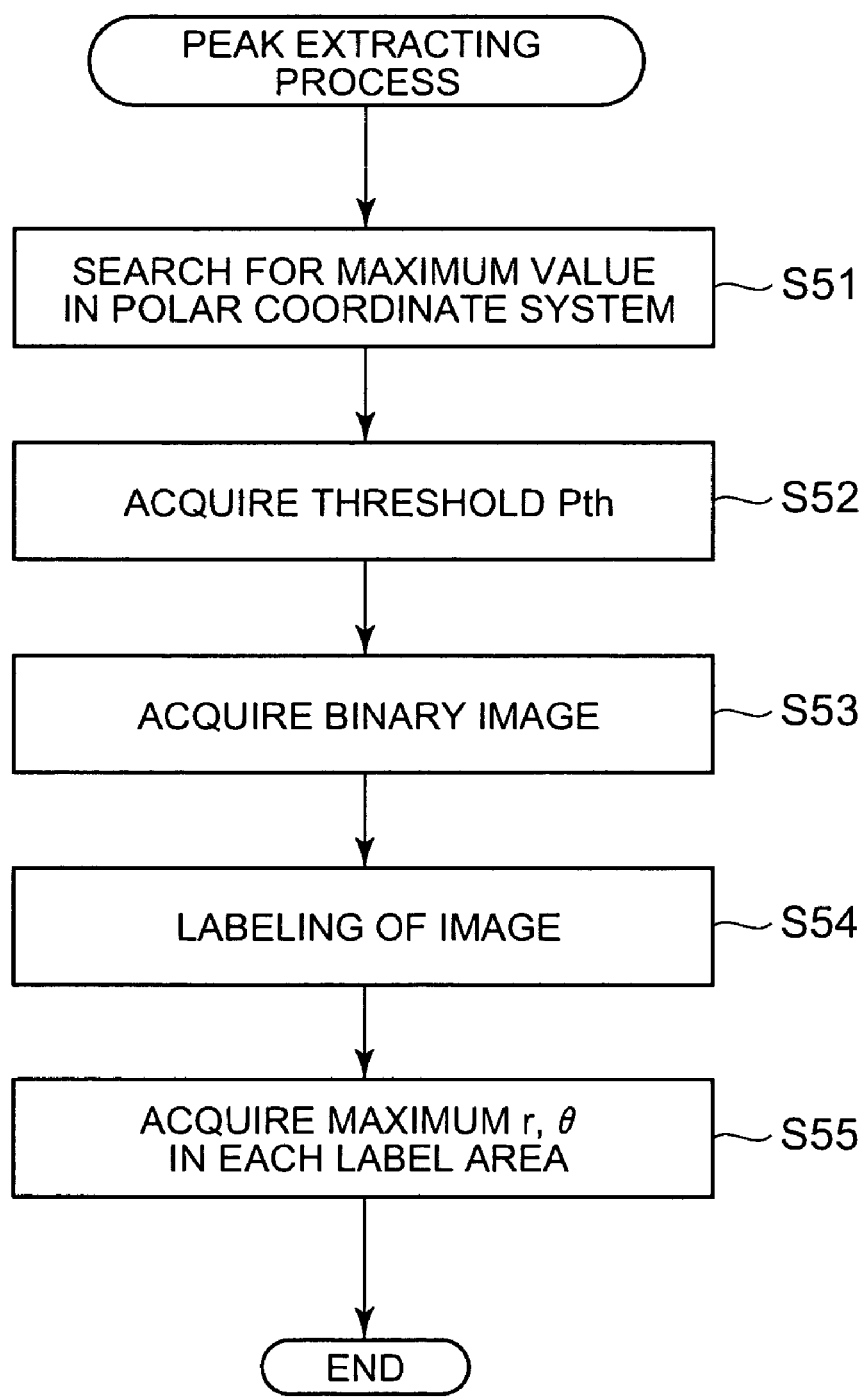
FIG. 14 is a flowchart illustrating the contents of a process of detecting peaks from data of the polar coordinate system, which is executed by the image processing apparatus shown in FIG. 2.

Next, the image processing apparatus 25 extracts a peak from the generated data p(r, θ). For this purpose, the image processing apparatus 25 executes a process of extracting the peak according to a flowchart as shown in FIG. 14.

The image processing apparatus 25 searches for a maximum value pmax at p(r, θ) (step S51).

The image processing apparatus 25 acquires a threshold pth=pmax*k (k being a constant value equal to or greater than 0 up to 1) (step S52).

The image processing apparatus 25 generates a binary image B(r, θ) from p(r, θ) with pth being a threshold (step S53).

The image processing apparatus 25 performs image labeling of B(r, θ). Let N1 be the number of labels obtained then (step S54).

The image processing apparatus 25 checks r, θ in each label area when p(r, θ) is maximum. Then, the image processing apparatus 25 acquires the values as ri, θi (i=1 to N) (step S55). They become straight line parameters.

Figure 15A:
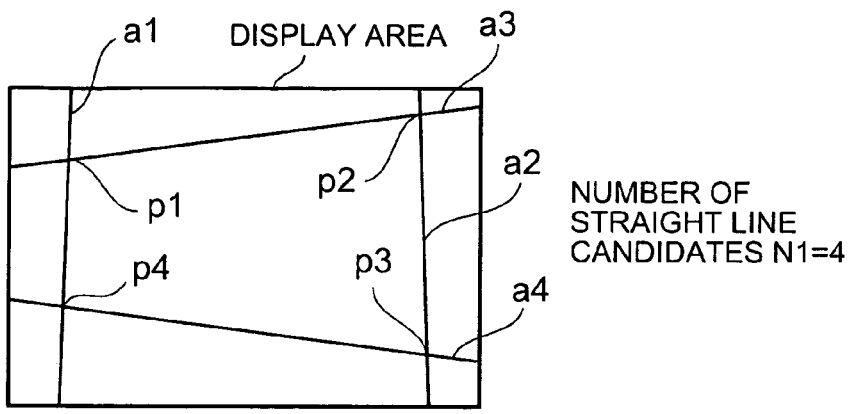
FIGS. 15A to 15C are diagrams for explaining an idea of detecting a quadrangle from straight lines extracted by detection of peaks.

Next, in case where the image processing apparatus 25 generates a quadrangle candidate using the detected straight line parameters (process at step S44 in FIG. 9), if four straight lines form a quadrangle as shown in FIG. 15A, opposite straight lines a1 and a3, for example, have intersection points p, p4, p2 and p3 with respect to two straight lines a2 and a4 other than the straight lines a1 and a3. In this case, the CPU 30 decides that a quadrangle could be extracted (YES at step S33 in FIG. 8).

Figure 15B:
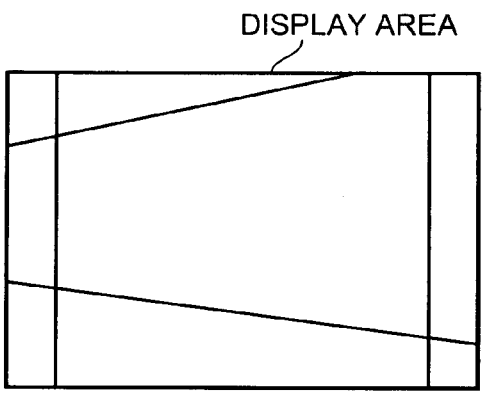
Figure 15C:
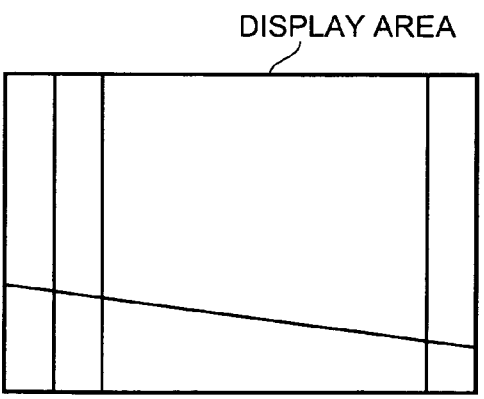

When there are no four intersection points as shown in FIGS. 15B and 15C, the CPU 30 decides that a quadrangle could not be extracted (NO at step S33).

Next, the image processing apparatus 25 selects the most adequate quadrangle from the extracted quadrangle candidates as representing the sides of the shooting target.

There are several schemes to achieve the selection. In the embodiment, the outermost quadrangle is selected from among the shot quadrangles. The "outermost quadrangle" is the one with the largest area among quadrangles formed by surrounding quadrangle candidates with X-axis and Y-axis parallel lines as shown in FIG. 6.

Given that the coordinates of the four vertexes of a quadrangle Ri are respectively (x0, y0), (x1, y1), (x2, y2) and (x3, y3), the area Si of the quadrangle is given by the following equation 14.

$$Si = \{\max(x0,x1,x2,x3) - \min(x0,x1,x2, x3)\} * \{\max(y0, y1,y2,y3) - \min(y0,y1,y2,y3)\}$$

Equation 14

Figure 16:
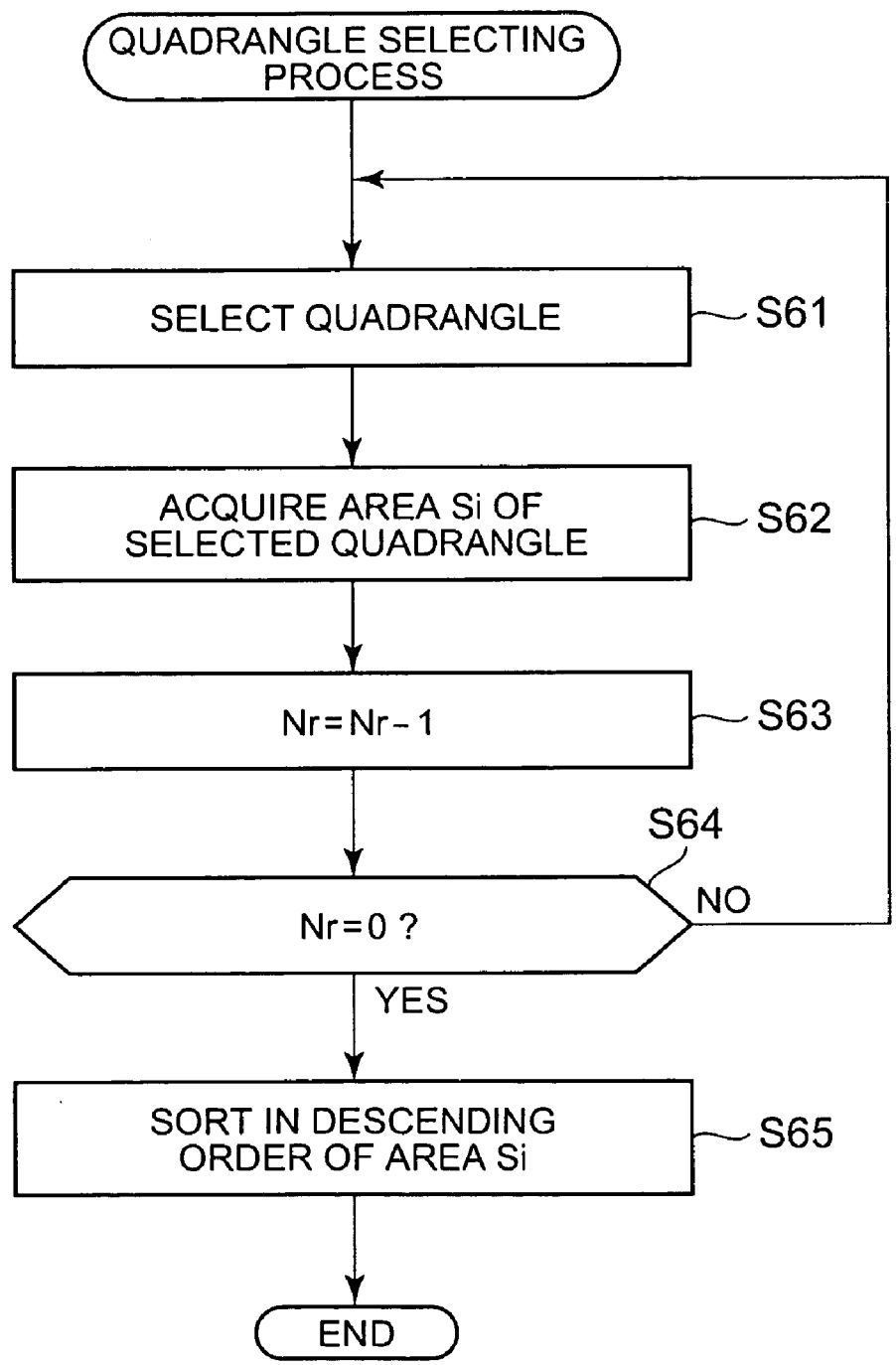
FIG. 16 is a flowchart illustrating the contents of a detected-quadrangle selecting process which is executed by the image processing apparatus shown in FIG. 2.

The image processing apparatus 25 selects this quadrangle according to a flowchart as shown in FIG. 16.

The image processing apparatus 25 selects one of quadrangle candidates whose number is Nr (step S61).

The image processing apparatus 25 acquires the area Si of the selected quadrangle according to the equation 10 (step S62).

The image processing apparatus 25 decrements the number of candidates Nr (step S63).

The image processing apparatus 25 determines whether the number of candidates Nr becomes 0 or not (step S64).

When it is decided that the number of candidates Nr has not become 0 (NO at step S64), the image processing apparatus 25 executes the processes at steps S61 to S63 again.

When it is decided that the number of candidates Nr has become 0 (YES at step S64) by repetitively executing the processes, the image processing apparatus 25 sorts data of quadrangle candidates in the descending order of the acquired areas Si (step S65) from a smaller area to a larger one.

Then, the image processing apparatus 25 treats the first quadrangle as the contour of the quadrangle with the highest priority. Even when there are plural quadrangle candidates, the outermost quadrangle is always selected by priority. The reason for the selection of the outermost quadrangle by priority is because the zoom and the shooting position are normally adjusted in such a way that the shooting target intentionally becomes maximum in the angle of view, so that the outermost quadrangle is considered as the contour of the shooting target.

Therefore, it is expected that the contour of the shooting target is extracted almost automatically. Even if a wrong quadrangle is extracted, the user generally checks quadrangles sequentially from the outermost one. If straight lines indicating the contour of the shooting target are extracted, the quadrangle of the real shooting target is selected by sequentially depressing the NO key.

It is therefore possible to acquire affine parameters which are individual elements in the matrix shown in the equation 8 according to the equations 5 and 8 by using the coordinates (x0, y0), (x1, y1), (x2, y2) and (x3, y3) of the four vertexes of the selected quadrangle of the shooting target.

(1) Extraction of Affine Parameters from the Image of the Shooting Target

Based on this view, the image processing apparatus 25 acquires affine parameters from the vertexes of the quadrangle. This process will be described based on a flowchart as shown in FIG. 17.

The image processing apparatus 25 computes projection coefficients α and β from coordinates (x0, y0), (x1, y1), (x2, y2) and (x3, y3) of the four vertexes of the quadrangle according to the equation 5 (step S71).

The image processing apparatus 25 computes the aspect ratio k of the shooting target according to the equation 10 (step S72).

The image processing apparatus 25 designates a center point (uc, vc) of the image (step S73).

The image processing apparatus 25 compares a maximum image size vmax/umax with the aspect ratio k expressed by the equation 10 (step S74).

When vmax/umax≦k (NO at step S74), considering that the aspect ratio k is not changed, the image processing apparatus 25 decides that the maximum image size umax on the U-axis (horizontal) side is greater than the image size of the shooting target. Then, the image processing apparatus 25 acquires the values of m and n according to the invention the condition (1) in the equation 11 in such a way that the maximum image size on the V-axis side matches with the image size of the shooting target (step S75).

When vmax/umax>k (YES at step S74), considering that the aspect ratio k is not changed, the image processing apparatus 25 decides that the maximum image size vmax on the V-axis (vertical) side is greater than the image size of the shooting target. Then, the image processing apparatus 25 acquires the values of m and n according to the invention the condition (2) in the equation 11 in such a way that the maximum image size on the U-axis side matches with the image size of the shooting target (step S76).

The image processing apparatus 25 acquires an affine transformation matrix Af from the computed m and n and the four vertex coordinates (x0, y0), (x1, y1), (x2, y2) and (x3, y3) of the quadrangle according to the equation 8 (step S77).

With an each element in the affine transformation matrix Af taken as an affine parameter A, the image processing apparatus 25 acquires this affine parameter A (step S78).

Figure 18A:
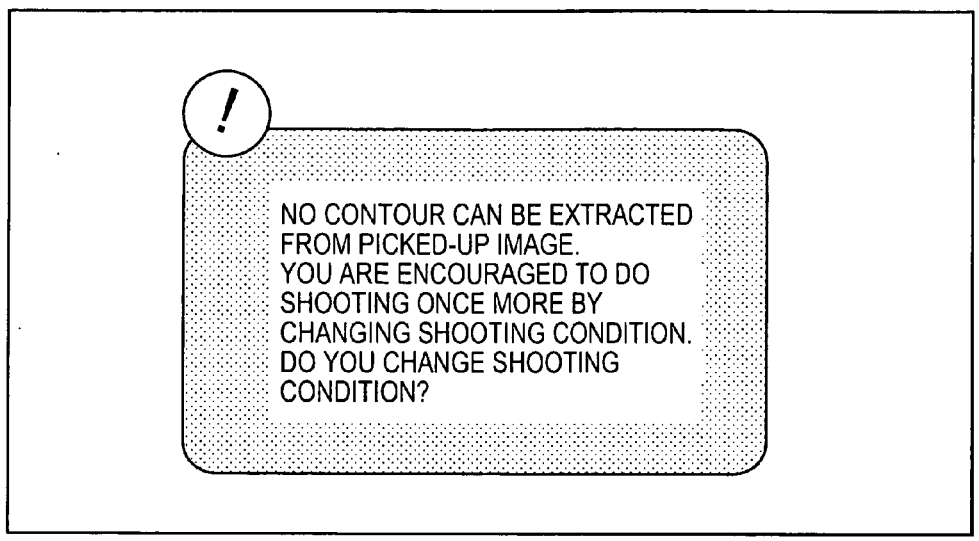
FIGS. 18A and 18B are explanatory diagrams showing the contents of a warning when a quadrangle could not be extracted.
Figure 18B:
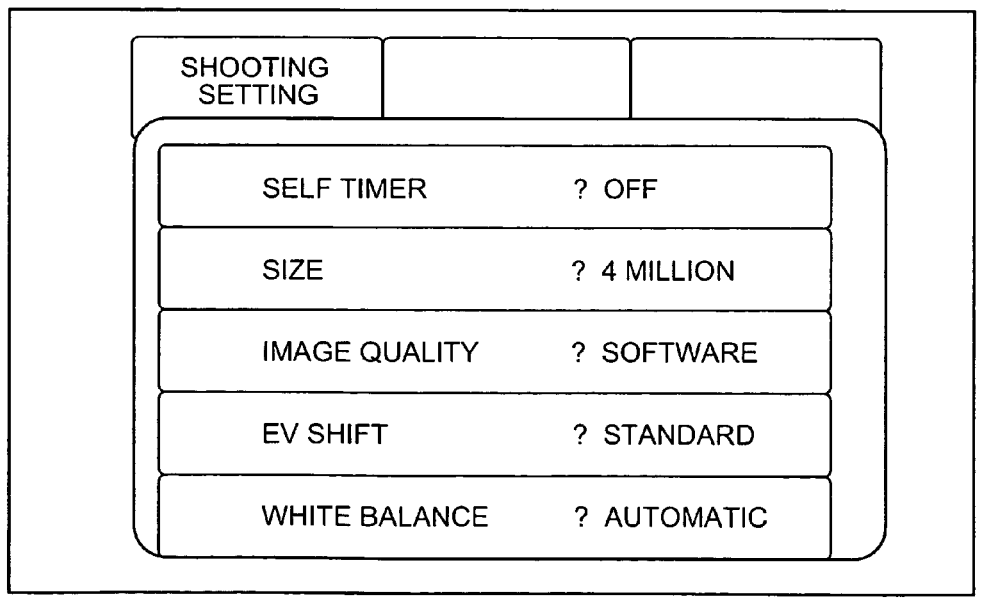

There is a case where the shooting condition or so is inadequate as in a case where a quadrangle cannot be identified (NO at step S33 in FIG. 8). In such a case, it is preferable that a warning statement as shown in FIG. 18A should be displayed on the liquid crystal monitor 12 to properly warns the photographer that the area could not be detected, allow the photographer to set the mode to the camera shooting setting mode as shown in FIG. 18B to change the shooting condition and prompt the photographer to do shooting again. There may be another case where it is preferable to warn the photographer to change the shooting condition again.

Figure 19:
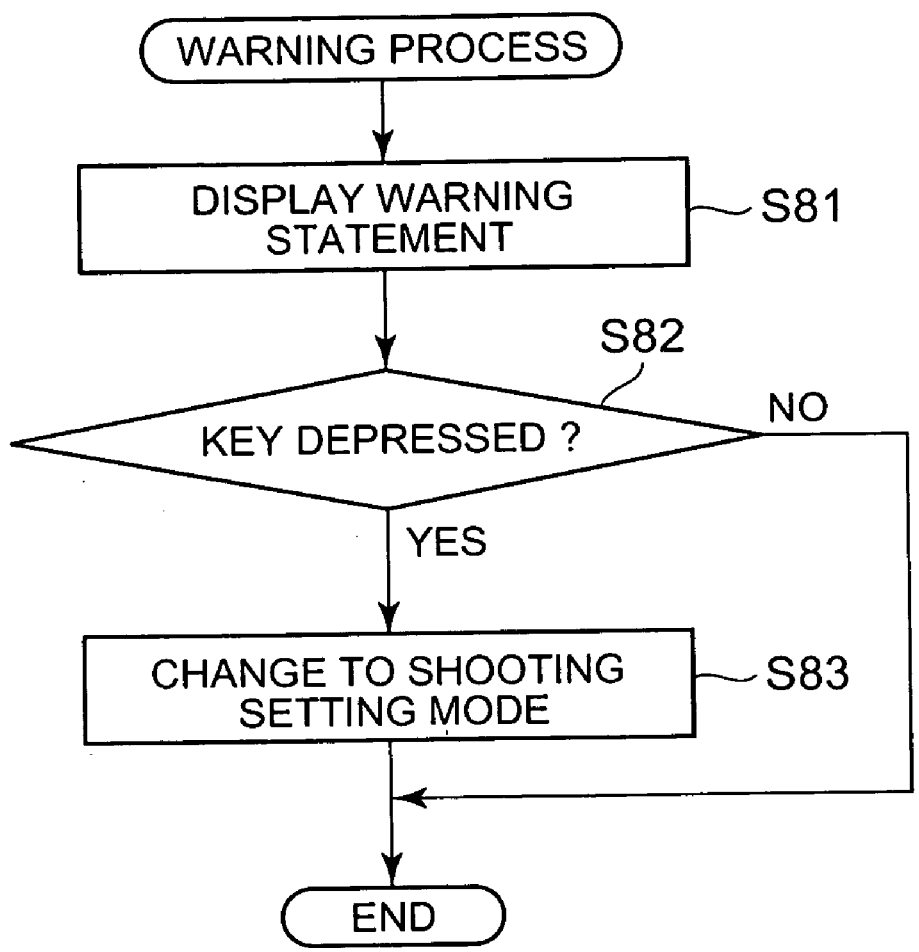
FIG. 19 is a flowchart illustrating the contents of a warning process which is executed by a CPU shown in FIG. 2.

When such adequate projection parameters could not be acquired, the CPU 30 performs a warning process according to a flowchart as shown in FIG. 19 (step S27 in FIG. 5).

The CPU 30 controls the display unit 24 to display a warning statement as shown in FIG. 18A on the liquid crystal monitor 12 (step S81).

The CPU 30 determines which one of the YES key and NO key has been depressed based on the operation information sent from the operation unit 26 (step S82).

When the CPU 30 has decided that the NO key has been depressed (NO at step S82), the CPU 30 terminates this warning process.

When the CPU 30 has decided that the YES key has been depressed (YES at step S82), on the other hand, the CPU 30 changes the mode to the shooting mode (step S83), and terminates this warning process.

(2) Image Transformation Using the Extracted Affine Parameters

Now, the image processing method of preparing a corrected image by using the acquired affine parameters will be described below.

Figure 20:
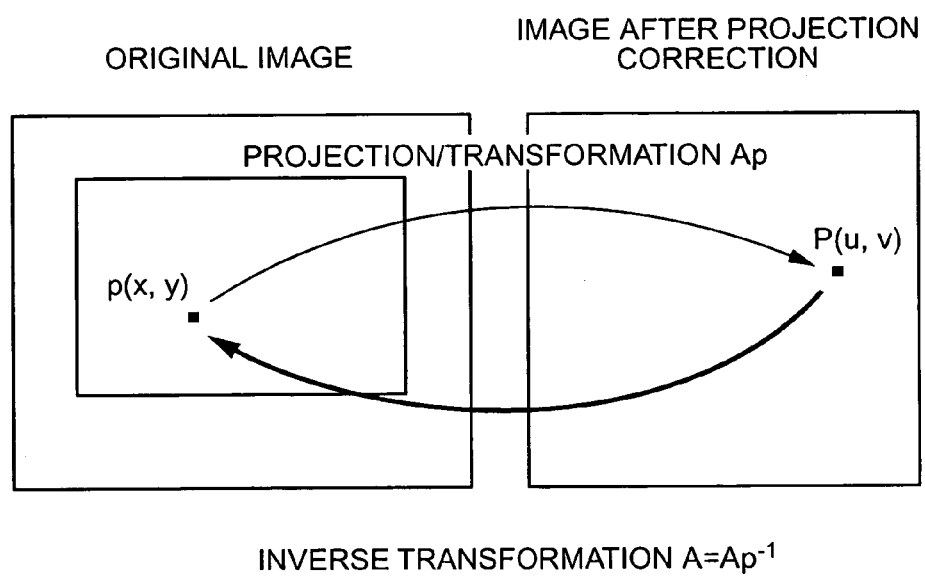
FIG. 20 is an explanatory diagram of inverse transformation for acquiring an original image from an image after projection transformation.

First, in executing projection transformation or some other affine transformation using the affine parameters, assume that point p(x, y) of the original image corresponds to a point P(u, v) of the image acquired by the transformation, such as projection transformation, using a transformation matrix Ap as shown in FIG. 20. Then, it is more preferable to determine the point p(x, y) of the original image that corresponds to the point P(u, v) of the transformed image than to determine the point P(u, v) of the transformed image that corresponds to the point p(x, y) of the original image.

An interpolation method that is derived from the bilinear method is used here to determine the coordinates of the point (P) of the transformed image. The interpolation method derived from the bilinear method is a method of detecting the coordinates of the point of an image (transformed image) that correspond to the coordinates of a point of another image (original image) and determining the (pixel) value of the point P(u, v) of the transformed image from the (pixel) values of four peripheral points of the point (as expressed by coordinates) of the other image. With this method, the pixel value P of the point P of the transformed image is computed by the following equation 20.

$$Si = \{\max(x0, x1, x2, x3) - \min(x0, x1, x2, x3)\} * \{\max(y0, y1, y2, y3) - \min(y0, y1, y2, y3)\} \quad \text{Equation 15}$$

$$P(u, v) = (1-kx)*(1-ky)*p(X, Y) + kx*(1-ky)*p(X+1, Y) + (1-kx)*ky*p(X, Y+1) + kx*ky*p(X+1, Y+1)$$

where kx: the decimal value of x,
ky: the decimal value of y,
X: integer part (x) and
Y: integer part (y)

provided that the coordinates of the point p of the other image is expressed as p(x, y).

Figure 21:
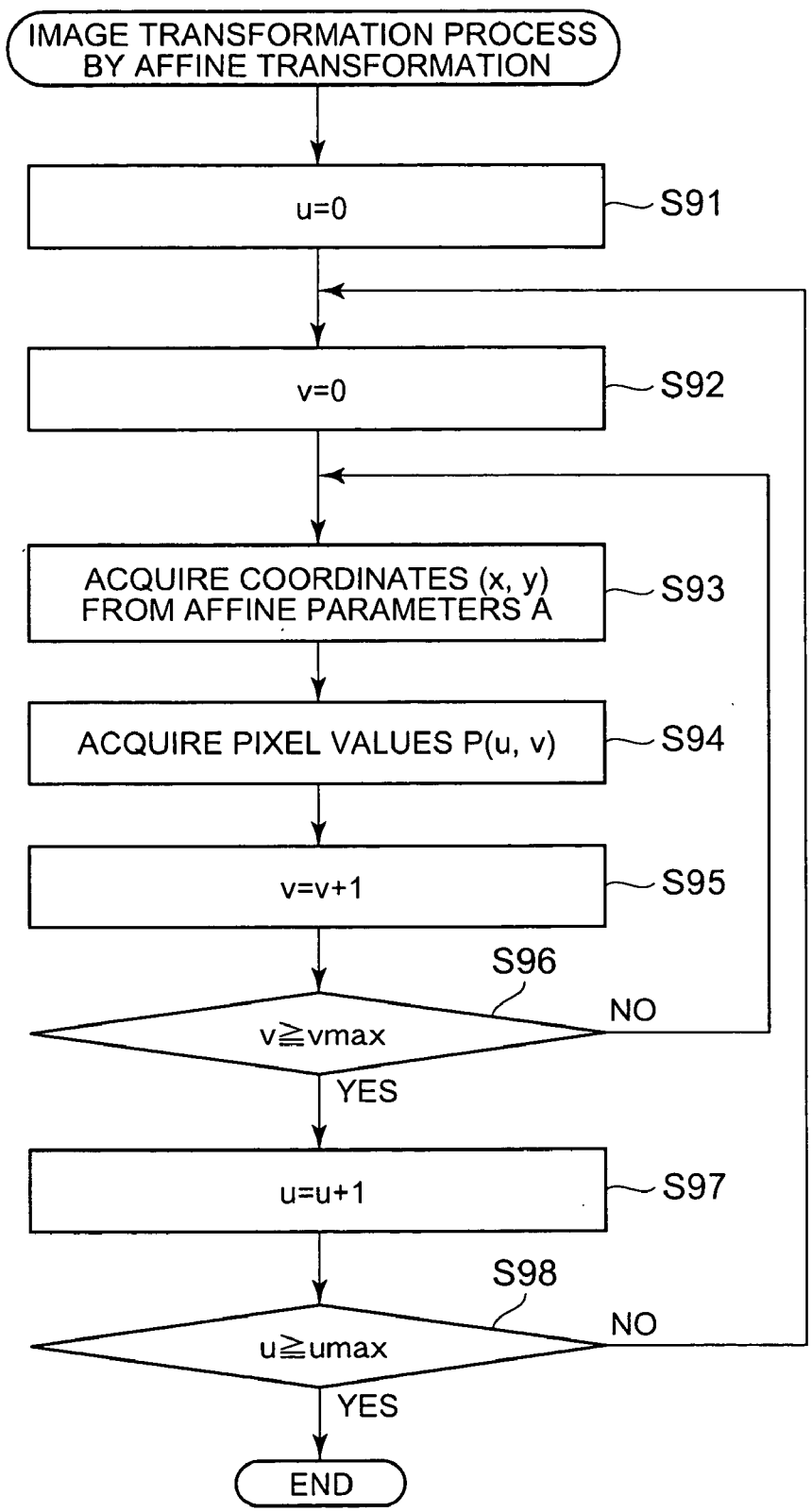
FIG. 21 is a flowchart illustrating the contents of an image transformation process based on affine transformation, which is executed by the image processing apparatus shown in FIG. 2.

The image processing apparatus 25 executes the process of the flowchart of FIG. 21 in order to determine the point p(x, y) of the original image that corresponds to the point P(u, v) of the transformed image.

First, the image processing apparatus 25 initializes the pixel position u of the transformed image to 0 (step S91).

Then, the image processing apparatus 25 initializes the pixel position v of the transformed image to 0 (step S92).

Then, the image processing apparatus 25 substitutes the pixel position (u, v) of the transformed image using the affine parameters A acquired from the equation 5 and 8, and determines the pixel position (x, y) of the original image using the equations 12 (step S93).

Thereafter, the image processing apparatus 25 determines the pixel value P(u, v) from the determined pixel position (x, y) by the bilinear method using the equation 15 (step S94).

Then, the image processing apparatus 25 increments the coordinate v of the corrected image by one (step S95).

Then, the image processing apparatus 25 compares the coordinate v of the corrected image and the maximum value vmax of the coordinate v with determines if the coordinate v of the corrected image becomes equal to or greater than the maximum value vmax or not (step S96).

When it is determined that the coordinate v is smaller than the maximum value vmax (NO at step S96), the image processing apparatus 25 repeats the sequence of processes of steps S93 through S95.

When it is determined that the coordinate v gets to the maximum value vmax as a result of repeating the sequence of processes of steps S93 through S95 (YES at step S96), the image processing apparatus 25 increments the coordinate u of the corrected image by one (step S97).

The image processing apparatus 25 then compares the coordinate u of the corrected image with the maximum value umax of the coordinate u, and determines if the coordinate u of the corrected image becomes equal to or greater than the maximum value umax or not (step S98).

When it is determined that the coordinate u is smaller than the maximum value umax (NO at step S98), the image processing apparatus 25 repeats the sequence of processes of steps S92 through S97.

When it is determined that the coordinate u gets to the maximum value umax as a result of repeating the sequence of processes of steps S92 through S97 (YES at step S98), the image processing apparatus 25 terminates the image transformation process.

(3) Adjustment of Image Transformation

A description will now be given of adjustment on an image which has been subjected to image transformation once (step S22 in FIG. 5).

Figure 22A:
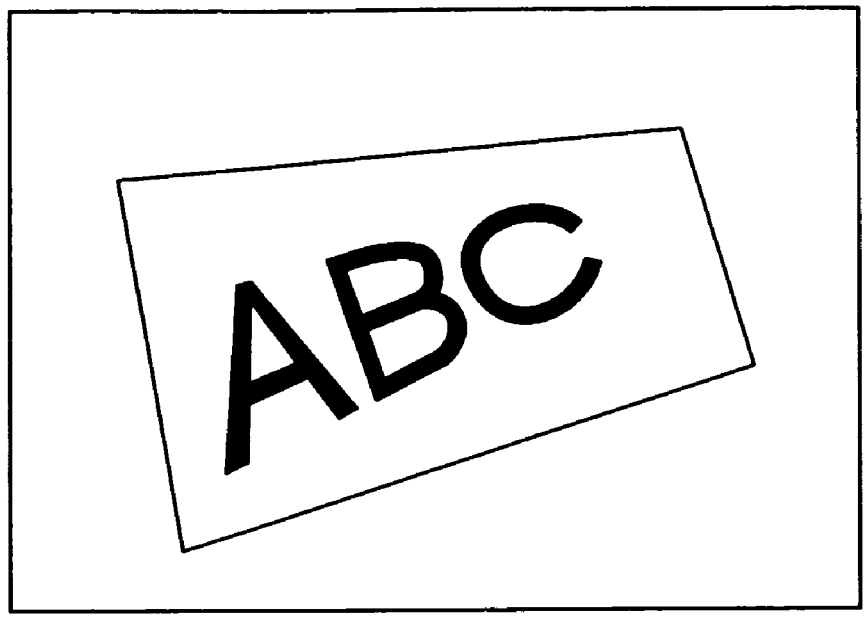
FIGS. 22A and 22B are diagrams showing an example where distortion of an image could not be corrected by projection transformation.
Figure 22B:
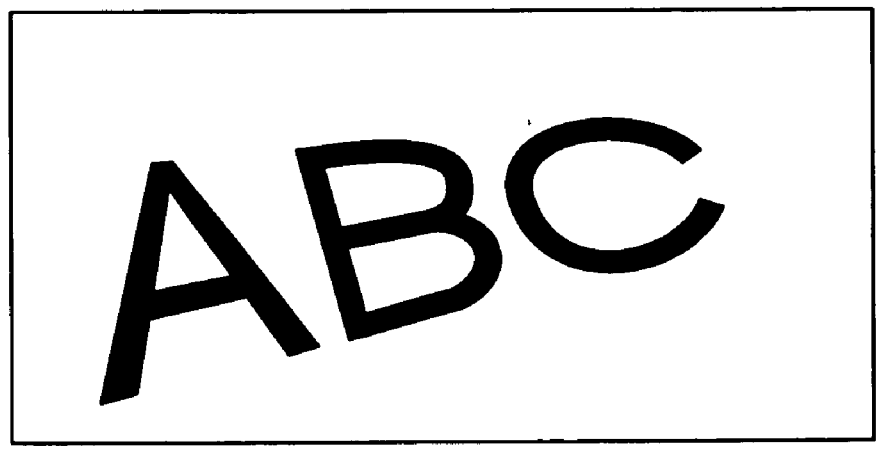

When the coordinates of the vertexes of the extracted quadrangle contain a slight error or so, there may be a case where the result of projection using the acquired affine parameters is not desirable as shown in FIG. 22A. In this respect, the digital camera 1 according to the embodiment is so configured as to be able to adjust an image which has undergone image transformation once and allow a user to adjust projection transformation in order to obtain an image as shown in FIG. 22B.

When the user operates any of the projection transformation keys and the rotation correction keys on the operation unit 26, the operation unit 26 sends its operation information to the CPU 30 in response to the user's operation. The CPU 30 discriminates the operation information and controls the image processing apparatus 25 according to the decision result.

Figure 23:
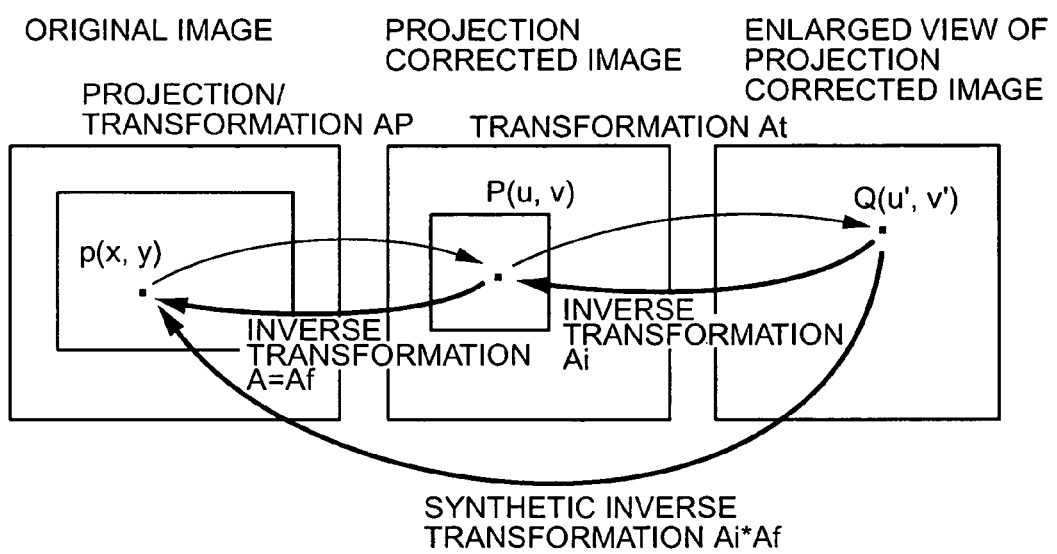
FIG. 23 is a diagram for explaining the correlation among an original image, projection-transformed image and an enlarged projection-transformed image.

As shown in FIG. 23, at the time of acquiring an interpolation pixel Q(u', v') of a corrected image, inverse transformation Ai is performed on the interpolation pixel Q(u', v') to acquire a corrected image P(u, v) corresponding to the interpolation pixel Q(u', v'), inverse transformation is further performed on the corrected image P(u, v) to acquire p(x, y) of the original image, and pixel interpolation is carried out on the image p(x, y). When double image transformations, such as projection transformation and enlargement transformation or so, are carried out, a transformation matrix resulting from the two transformations should be acquired in advance so that the original image could be transformed in a single transformation. This can acquire an image faster with less image degradation than the case where two transformations are performed.

A rotation inverse transformation matrix Ar when an image before transformation is acquired from a transformed image obtained by rotating the image before transformation by an angle θ about the X axis and the Y axis is expressed by an equation 16 given below.

$$Ar = \begin{bmatrix} \cos\theta & -\sin\theta & 0 \\ \sin\theta & \cos\theta & 0 \\ -Xc\cos\theta - Yc\sin\theta + Xc & Xc\sin\theta - Yc\cos\theta + Yc & 1 \end{bmatrix}$$ Equation 16

A scale matrix Asc when an image before transformation is acquired from a transformed image obtained by magnifying the image before transformation by Sc about the X axis and the Y axis is expressed by an equation 17 given below.

$$Asc = \begin{bmatrix} 1/Sc^- & 0 & 0 \\ 0 & 1/Sc & 0 \\ Xc\left(1 - \frac{1}{Sc}\right) & Yc\left(1 - \frac{1}{Sc}\right) & 1 \end{bmatrix}$$ Equation 17

Once an image is enlarged, a rounding error process or so may be executed in adjustment or computation of affine parameters. To enlarge an image, therefore, it is necessary to set the affine parameters to those of an equal magnification before enlargement.

A shift matrix As when an image before transformation is acquired from a transformed image obtained by shifting the image before transformation by Tx and Ty in the X direction and Y direction respectively is expressed by the following equation 18.

$$As = \begin{bmatrix} 1 & 0 & 0 \\ 0 & 1 & 0 \\ -Tx & -Ty & 1 \end{bmatrix}$$ Equation 18

A projection effect matrix Ap when an image before transformation is acquired from a transformed image obtained by tilting an image before correction by α and β in the X direction and Y direction respectively is expressed by the following equation 19.

$$Ap = \begin{bmatrix} 1 & 0 & \alpha \\ 0 & 1 & \beta \\ 0 & 0 & 1 \end{bmatrix}$$ Equation 19

In executing the double inverse transformations, an inverse transformation matrix A therefor is expressed by the following equation 20.

$$A = Ai(2) * Ai(1)$$ Equation 20

In the embodiment, the projection effect coefficients α and β are set by steps of 0.1, while the angle correction parameter θ is set by angles of one degree. It is to be noted however that the adjustment widths of the individual parameters can be determined while checking the actual effect of correction.

An image transformation adjusting process which is executed based on such an idea will be described referring to a flowchart shown in FIG. 24.

The CPU 30 sets center coordinates Xc and Yc of an image (step S101).

Based on the operation information sent from the operation unit 26, the CPU 30 determines whether any of the projection transformation keys has been depressed (step S102).

When it is determined that some projection transformation key has been depressed (YES at step S102), the CPU 30 discriminates the type of the depressed projection transformation key among the upper reduction key 111, the lower reduction key 112, the right reduction key 113 and the left reduction key 114 (steps S103 to S106).

When it is determined that the depressed projection transformation key is the upper reduction key 111, the CPU 30 substitutes α=0.1 and β=0 in the projection effect matrix Ap given in the equation 19, yielding the inverse transformation Ai=Ap (step S103).

When it is determined that the depressed projection transformation key is the lower reduction key 112, the CPU 30 substitutes α=−0.1 and β=0 in the projection effect matrix Ap given in the equation 19, yielding the inverse transformation Ai=Ap (step S104).

When it is determined that the depressed projection transformation key is the right reduction key 113, the CPU 30 substitutes α=0 and β=0.1 in the projection effect matrix Ap given in the equation 19, yielding the inverse transformation Ai=Ap (step S105).

When it is determined that the depressed projection transformation key is the left reduction key 114, the CPU 30 substitutes α=0 and β=−0.1 in the projection effect matrix Ap given in the equation 19, yielding the inverse transformation Ai=Ap (step S106).

When it is determined that no projection transformation key has been depressed (NO at step S102), the CPU 30 determines whether any of the rotation correction keys has been depressed (step S107).

When it is determined that some rotation correction key has been depressed (YES at step S107), the CPU 30 discriminates the type of the depressed rotation correction key (steps S108 and S109).

When it is determined that the depressed rotation correction key is the rightward rotation key 115, the CPU 30 substitutes θ=−1 in the rotation inverse transformation matrix Ar given in the equation 16, yielding the inverse transformation Ai=Ar (step S108).

When it is determined that the depressed rotation correction key is the leftward rotation key 116, the CPU 30 substitutes θ=1 in the rotation inverse transformation matrix Ar given in the equation 16, yielding the inverse transformation Ai=Ar (step S109).

When it is determined that one of the projection transformation keys or one of the rotation correction keys has been depressed and the inverse transformation Ai is set as a consequent (steps S103 to S106, S108 and S109), the CPU 30 acquires the inverse transformation matrix A according to the equation 20 (step S110).

The CPU 30 supplies the acquired inverse transformation A to the image processing apparatus 25 and controls the image processing apparatus 25 in such a way as to perform image transformation based on the inverse transformation A.

Based on the supplied inverse transformation A, the image processing apparatus 25 performs image transformation by the affine transformation (step S111), and then terminates the image transformation adjusting process.

When it is determined that no rotation correction key has been depressed (NO at step S107), the CPU 30 terminates the image transformation adjusting process immediately.

The corrected image can be further adjusted manually by performing image transformation by the above-described method using the affine parameters obtained in the above manner.

In case of adjusting an image as shown in FIG. 22, for example, as the image is distorted leftward, the rightward rotation key 115 is depressed first. As a result, the image processing apparatus 25 rotates the image rightward. When the rightward rotation key 115 is kept depressed and depression of the rightward rotation key 115 is stopped when a sequence of characters is displayed correctly, the image processing apparatus 25 stops rotating the image rightward.

When the left reduction key 114 is depressed for the left-hand side of the next image is larger than the right-hand side, the image processing apparatus 25 adjusts the left and right parts of the image. When the left reduction key 114 is kept depressed and depression of the left reduction key 114 is stopped when the right and left parts are balanced, the image processing apparatus 25 stops reduction of the left part.

Because this method can acquire an image by performing just a single image transformation on the original image, the method can provide an image with a better quality than the method of performing rotation and projection transformation again on an image which has undergone projection correction once.

(3) Extraction of Image Effect Correction Parameters Relating to Luminance or Color Difference or so and Image Effect Process Now, the process for extracting image effect correction parameters from the image obtained in the above-described manner and the image effect process that utilizes the parameters will be described below. The image effect process is an operation for obtaining a clearer image.

The image obtained in this manner is the image of the whiteboard 2 or a document or so extracted. When an image effect such as histogram correction is executed, it is expected to acquire more effective parameters by acquiring parameters from an image to be extracted than by performing correction using correction parameters obtained from the original image.

In the embodiment, a luminance (Y) histogram is prepared from corrected image data and an image effect process is performed according to the histogram.

Image effect correction parameters are variables needed for the image effect process, such as the maximum value, the minimum value and the peak value of a luminance histogram.

Figure 25:
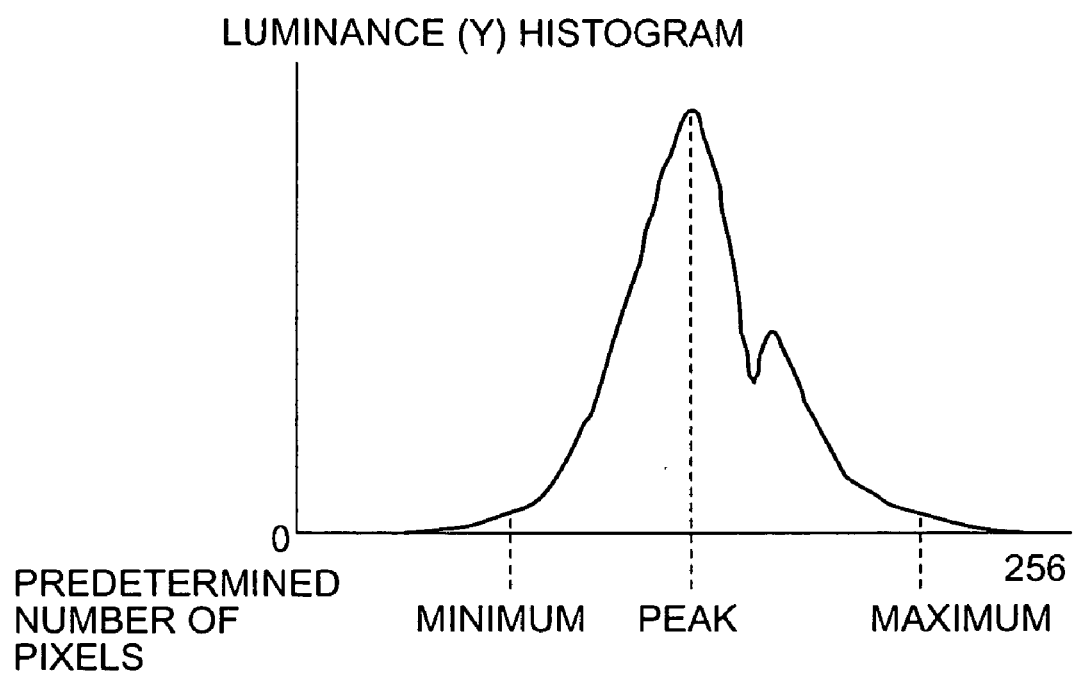
FIG. 25 is an explanatory diagram showing one example of a luminance histogram.

The luminance histogram shows the distribution of the luminance values (Y) present in the image and is generated by counting the number of pixels for each luminance value. FIG. 25 is a schematic illustration of an exemplar luminance histogram. In FIG. 25, the horizontal axis represents the luminance value (Y) while the vertical axis represents the number of pixels. To correct the image effect, it is necessary to determine the maximum value (Ymax), the minimum value (Ymin) and the peak value (Ypeak) as image effect correction parameters.

The maximum value is the value that shows the highest luminance value among the luminance values whose count number is greater than a preset number obtained by counting the number of pixels for each luminance value and the minimum value is the value that shows the lowest luminance value among the luminance values whose count number is greater than a preset number obtained by counting the number of pixels for each luminance value. The peak value is the luminance value where the count number becomes maximum. It is assumed that the peak value represents the luminance value of the background color of the shooting target.

To acquire a visually excellent image by correcting the image effect, it is necessary to change image effect correction method by the background color of the shooting target because the correction effect varies depending on the background color of the shooting target. Therefore, it is necessary to determine the background color of the shooting target.

The background color of the shooting target is determined from the peak values of the luminance histogram and the color difference histogram.

The background color of the shooting target is of one of three categories. The first category is the white background which is provided by, for example, a whiteboard, a notebook or the like. The second category is the black background which is provided by, for example, a blackboard or so. The third category is a background color other than white and black, which is provided by, for example, a magazine or a pamphlet.

Specifically, the background color of the shooting target is determined by means of the determining equations given below.

(2-a) Requirement for White Background Color

The requirement for white background color is expressed by the equation 21 below.

When the requirement of the equation 21 is met, the background color or the shooting target is determined to be white (W).

requirement for white=(|$U$peak|<color threshold) & (|$V$peak|<color threshold) & ($Y$peak>white determining value)  Equation 21

(2-b) Requirement for Black Background Color

The requirement for black background color is expressed by the following equation 22. When the requirement of the equation 22 is met, the background color of the shooting target is determined to be black (b).

requirement for black=(|$U$peak|<color threshold) & (|$V$peak|<color threshold) & ($Y$peak<black determining value)  Equation 22

When the requirements of the equations 21 and 22 are not met, the background color of the shooting target is determined to be a color (C) other than white and black. For example, 50 is selected for the color threshold, 128 is selected for the white determining threshold, and 50 is selected for the black determining threshold.

Figure 26:
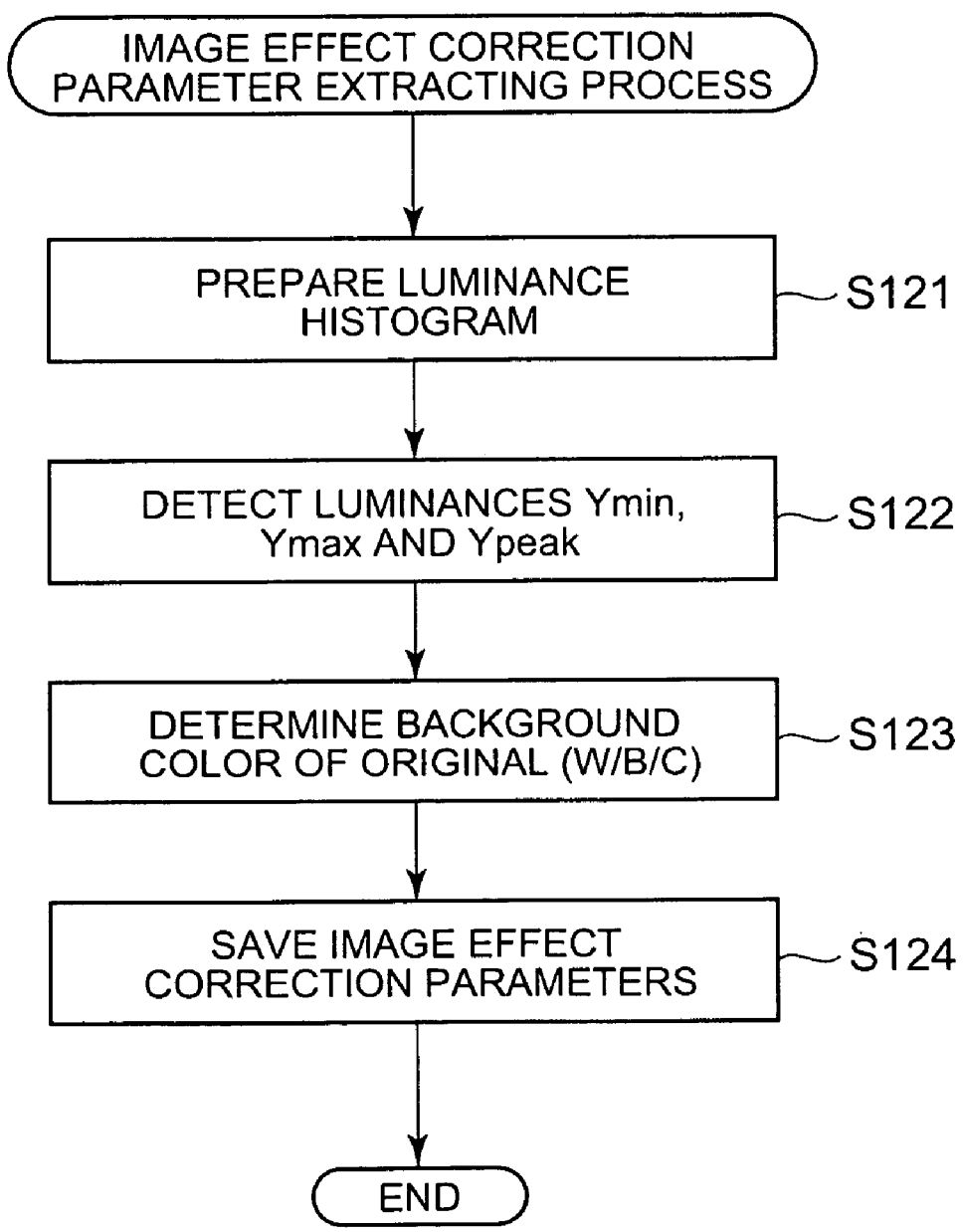
FIG. 26 is a flowchart illustrating the contents of an extraction process for image effect correction parameters, which is executed by the image processing apparatus shown in FIG. 2.

On the basis of the above idea, the image processing apparatus 25 extracts image effect correction parameters, following the flowchart illustrated in FIG. 26.

The image processing apparatus 25 counts the number of pixels for each luminance (Y) value in the real original section and generates a luminance histogram as shown in FIG. 25.

Then, the image processing apparatus 25 acquires the luminance maximum value (Ymax), the luminance minimum value (Ymin) and a luminance peak value (Ypeak) from the generated luminance histogram (step S122).

Then, the image processing apparatus 25 determines the background color of the shooting target from the peak values (Y peak, U peak, V peak) of the luminance histogram using the background color determining requirement equations 21 and 22 (step S123).

Then, the image processing apparatus 25 stores the image effect correction parameters and the data on the background color of the shooting target in the memory 23 (step S124).

Subsequently, the image processing apparatus 25 performs the image effect process using the image effect correction parameters that are extracted in the above-described manner (step S24 in FIG. 5).

As pointed out above, the contents of the process should be changed according to the background color in order to effectively carry out an image effect process.

Figure 27A:
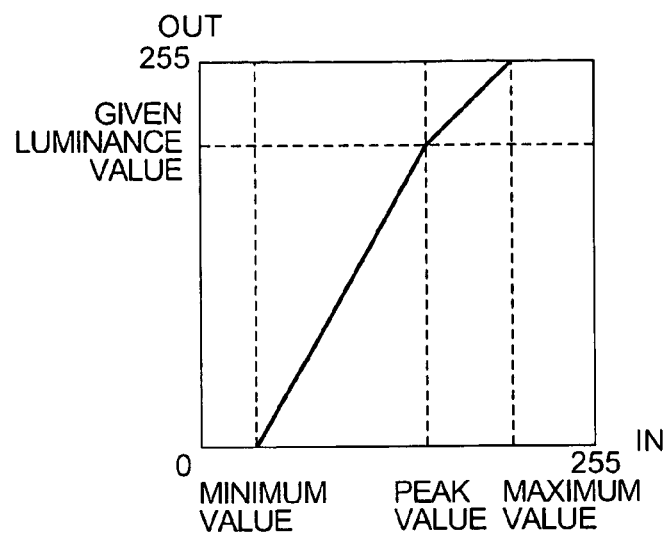
FIG. 27A an explanatory diagram showing an image effect process when the background color is white.
Figure 27B:
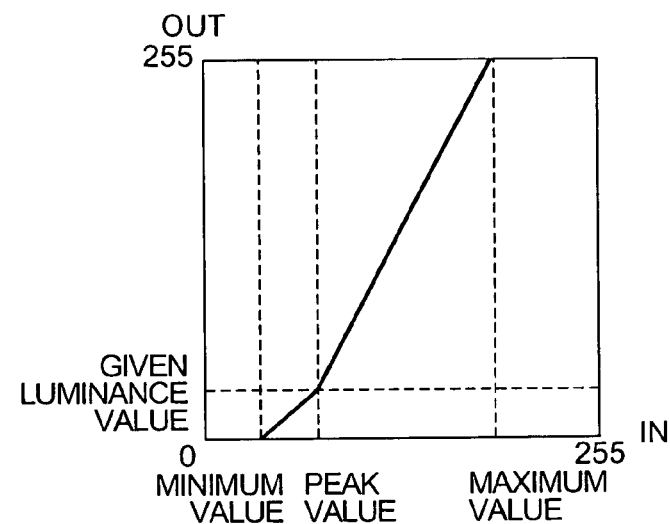
FIG. 27B an explanatory diagram showing an image effect process when the background color is black.

When the background color is white as in the case of a white board or a note book, luminance transformation as shown in FIG. 27A is carried out. When the background color is black as in the case of a blackboard, luminance transformation as shown in FIG. 27B is carried out. When the background color is other than white and black as in the case of a magazine or a pamphlet, a luminance transformation as shown in FIG. 27C is carried out.

Figure 27C:
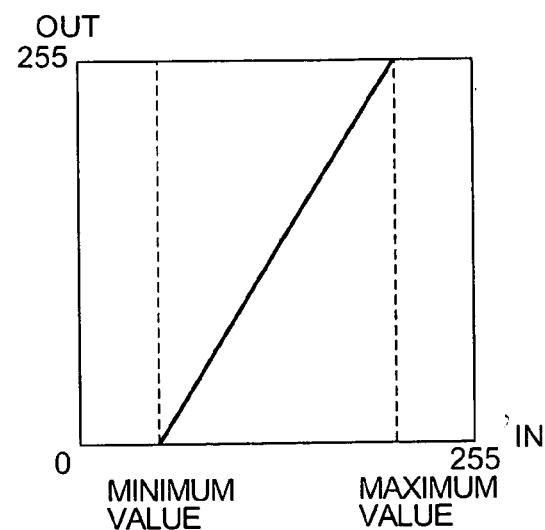
FIG. 27C an explanatory diagram showing an image effect process when the background color is other than white or black.

In FIGS. 27A, 27B and 27C, the horizontal axis represents the input pixel value and the vertical axis represents the pixel output value.

When the background color is white, the angle of inclination of the luminance transformation line is changed before and after the peak value as shown in FIG. 27A. For example, 230 is selected as a predetermined luminance value and the input luminance peak value is increased to the luminance level of 230. Then, the maximum value is brought up to the maximum luminance value. Therefore, the luminance transformation line is expressed by two straight line segments as shown in FIG. 27A.

When the background color is black, luminance transformation is carried out to bring the peak value to a predetermined luminance level (20) as shown in FIG. 27B. In this case again, the luminance transformation line is expressed by two straight line segments as shown in FIG. 27B.

When the background color is other than white and black, the part lower than the minimum value and the part higher than the maximum value are cut to define the luminance transformation line that is expressed by a single line segment as in the case of ordinary extension as shown in FIG. 27C.

A transformation table of the luminance (Y) of the background and the output (Y') may be prepared in advance and stored in the memory card 31. Then, the output value of each pixel will be determined from the input pixel value by referring to the prepared transformation table and the image effect process will be executed. A light pixel becomes lighter and a dark pixel becomes darker in an image obtained by such a transformation process to broaden the luminance distribution and make the image have better visibility. image effect process according to the flowchart of FIG. 28.

Then, the image processing apparatus 25 reads out the stored image effect correction parameters from the memory 23 (step S131).

The image processing apparatus 25 determines if the background color is white or not (step S132).

When it is determined that the background color is white (YES at step S132), the image processing apparatus 25 operates for luminance transformation to regulate the luminance histogram in a manner as described above by referring to FIG. 27A in order to make the background whiter and more visible (step S133).

When it is determined that the background color is not white (NO at step S132), the image processing apparatus 25 determines if the background color is black or not (step S134).

When it is determined that the background color is black (YES at step S134), the image processing apparatus 25 performs luminance transformation to adjust the luminance histogram in the manner described above by referring to FIG. 27B (step S135).

When it is determined that the background color is not black (NO at step S124), the image processing apparatus 25 performs luminance transformation to adjust the luminance histogram that corresponds to the background color of the shooting target in a manner as described above by referring to FIG. 27C (step S136).

The digital camera 1 according to the embodiment can set the mode to the preview mode as well as the shooting mode.

When the playback key on the operation unit 26 is depressed, the operation unit 26 sends its operation information to the CPU 30.

Figure 29:
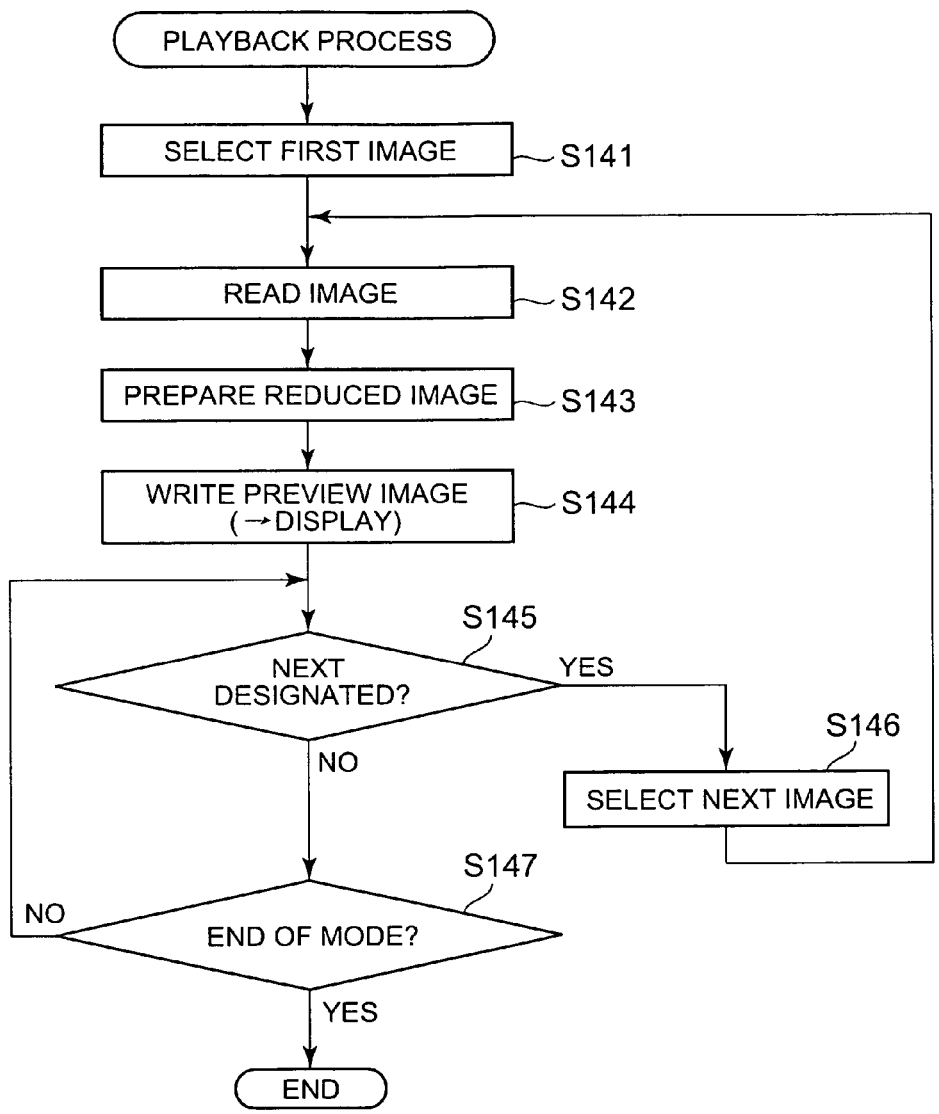
FIG. 29 is a flowchart illustrating the contents of a playback process which is executed by the CPU and the image processing apparatus shown in FIG. 2.

When the CPU 30 decides that the mode is set to the playback mode based on the operation information, the CPU 30 executes the playback process according to a flowchart shown in FIG. 29.

The CPU 30 selects a single image selected by the user from image files recorded in the memory card 31 (step S141).

The CPU 30 reads the selected image file from the memory card 31 and writes it in the memory 23 (step S142).

The CPU 30 prepares a reduced image from the read image (step S143).

The CPU 30 writes the reduced image in the preview image memory area in the memory 23 (step S144). Accordingly, the reduced image is displayed by the display unit 24 as a preview image as done in shooting mode. Viewing the display, the user can confirm the reproduced image.

When the user views the display and depresses the NO key to see another image, the operation unit 26 sends its operation information to the CPU 30.

According to the operation information, the CPU 30 determines whether a next image has been designated or not (step S145).

When it is determined that a next image has been designated (YES at step S145), the CPU 30 selects the next image (step S146), and then executes the sequence of processes of steps S142 to S144 again.

When it is determined that no next image has been designated (NO at step S145), the CPU 30 determines whether the playback mode has ended or not (step S147).

If the shooting key is not depressed, the CPU 30 decides that the playback mode has not ended (NO at step S147) and returns to step S145 (the decision of whether a next image has been designated or not).

When the shooting key is depressed, on the other hand, the CPU 30 receives its operation information from the operation unit 26 and decides that the playback mode has ended (YES at step S147), then terminates the playback process.

Writing of parameters in the file header will be discussed below.

At the time both of the original image and a corrected image are written as images of the JPEG format, the file name of the original image is written in the header (option data) area of the image file. When one wants to modify the corrected image again, an image with less degradation can be generated if it is generated from the original image, not by correcting the modified image file. This image edition may be executed in the digital camera 1. This image edition can also be carried out in a computer. It is expected that image edition using a computer can ensure image correct with higher accuracy.

Further, as parameters obtained at the time of executing image processing are written in the header, the computer can easily generate a corrected image gain using the parameters on the original image. This can allow the user to easily modify the previous corrected image promptly.

The header information includes the type of data (data name), the number of bytes of each piece of data and the contents of the data.

The CPU 30 sequentially stores the image file name of original image data, the image size of the corrected image, affine parameters and input/output data sets for preparing a histogram table in the header information memory area where the header information is recorded.

The input/output data sets are sets of data indicating the relationship between input data and output data, and has sets of input data and output data sorted in the ascending order of the input data from smaller input data to larger one for each point of transition where the slope of a straight line indicating the input-output relationship changes.

Given that pieces of input data of transition points are x1, x2, ..., xm in order from a smaller one and corresponding pieces of output data are y1, y2, ..., ym, the data sets are expressed by m sets of data (x1, y1), (x2, y2), ..., (xm, ym). In this case, if the input data x is xi<x<xi+1, the output data y is expressed by the following equation 23.

$$y = y_i \cdot (1-k) + y_{i+1} \cdot k \qquad \text{Equation 23}$$
$$\text{where } k = \frac{x - x_i}{x_{i+1} - x_i}$$

When the input data and output data have a relationship as shown in FIG. 27A, for example, the CPU 30 stores five data sets (0, 0), (minimum value, 0), (peak value, given luminance value (=230)), (maximum value, 255), and (255, 255) in the memory card 31.

When the input data and output data have a relationship as shown in FIG. 27B, likewise, the CPU 30 stores five data sets (0, 0), (minimum value, 0), (peak value, given luminance value (=20)), (maximum value, 255), and (255, 255) in the memory card 31.

When the input data and output data have a relationship as shown in FIG. 27C, the CPU 30 stores four data sets (0, 0), (minimum value, 0), (peak value, 255), and (255, 255) in the memory card 31.

As such data sets of luminance values are recorded, various histograms can be described. The CPU 30 writes such data in the memory card 31 at the same time as corrected image data is recorded (step S26 in FIG. 5).

Next, an editing process of a corrected image will be discussed.

There may be case where after image data is temporarily saved, one wants to correct the image data again. In this case, it is preferable to correct original image data at a time as mentioned above for the process results in less image degradation.

Figure 31:
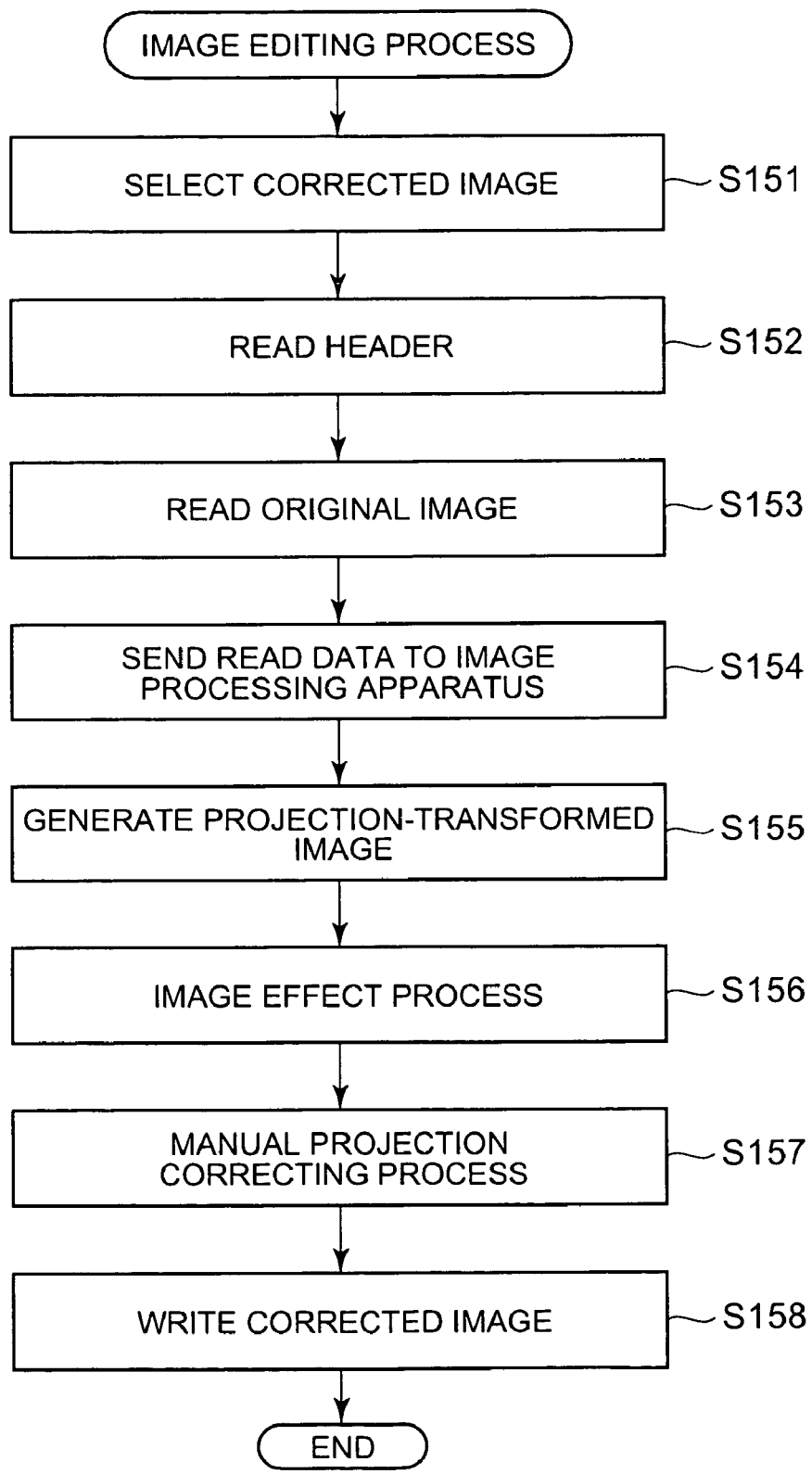
FIG. 31 is a flowchart illustrating the contents of a corrected-image re-editing process which is executed by the CPU and the image processing apparatus shown in FIG. 2.

When the user operates the control key to designate the edition mode, the CPU 30 executes an image editing process according to a flowchart shown in FIG. 31. The CPU 30 selects a corrected image according to the operation information sent from the operation unit 26 (step S151).

Then, the CPU 30 reads the header information from the header information memory area of the memory card 31 (step S152).

Then, the CPU 30 reads the original image (step S153).

The CPU 30 sends the read-out corrected image, header information and original image to the image processing apparatus 25 and controls the image processing apparatus 25 in such a way as to perform image correction again (step S154).

The image processing apparatus 25 acquires the corrected image, header information and original image from the CPU 30 and prepares a projection-transformed image (step S155). The image processing apparatus 25 sends the prepared projection-transformed image to the display unit 24 which in turns displays the image on the liquid crystal monitor 12.

Figure 28:
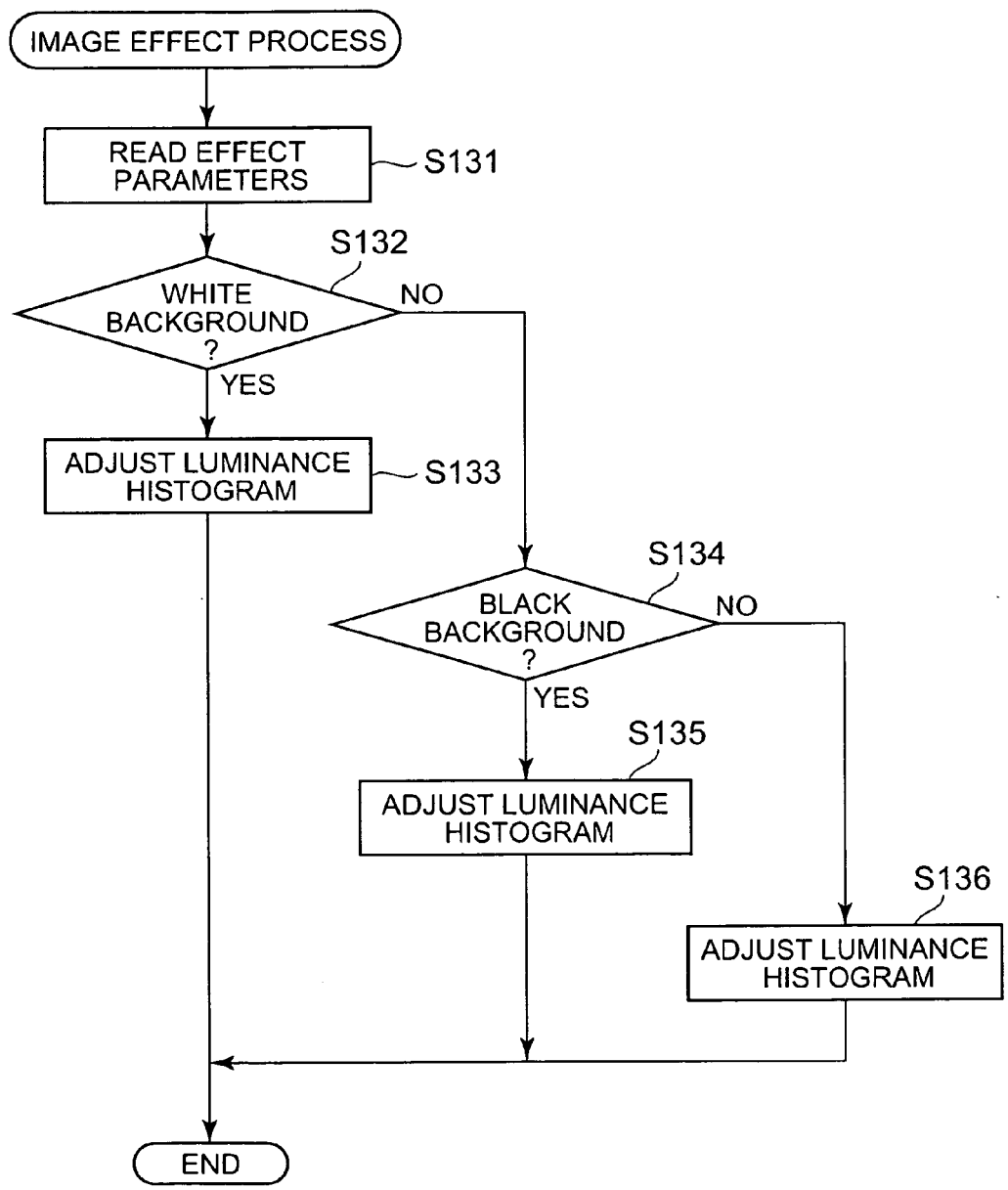
FIG. 28 is a flowchart illustrating the contents of an image effect process which is executed by the image processing apparatus shown in FIG. 2.

The image processing apparatus 25 executes an image effect process on the prepared projection-transformed image, following the flowchart shown in FIG. 28 (step S156).

When the user operates any of the projection transformation keys and the rotation correction keys, the operation unit 26 sends its operation information to the CPU 30. The CPU 30 acquires the operation information and controls the image processing apparatus 25 in such a way as to perform a manual projection correcting process.

Figure 24:
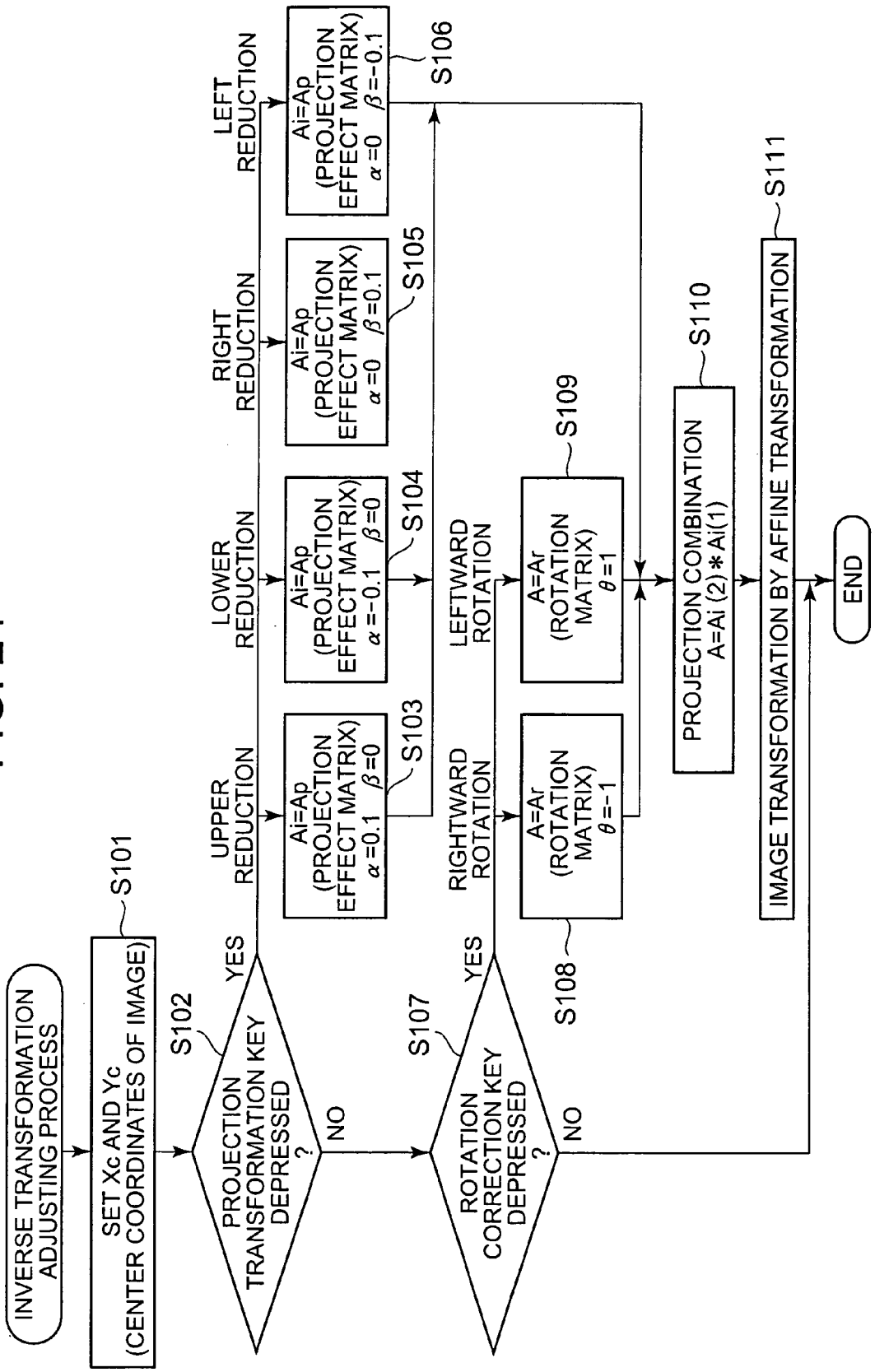
FIG. 24 is a flowchart illustrating the contents of correction adjustment and image transformation, which are executed by the image processing apparatus shown in FIG. 2.

The image processing apparatus 25 performs the manual projection correcting process according to the flowchart shown in FIG. 24 (step S157).

The image processing apparatus 25 writes the corrected image undergone the manual projection correcting process, together with the header information, in the memory card 31 (step S158), and then terminates the editing process.

According to the embodiment, as described above, the image processing apparatus acquires the contour of the image of the shooting target (whiteboard 2) to thereby acquire the shape of the shooting target, acquires the projection parameters from the positions of the vertexes of the quadrangle of the shooting target, then executes projection transformation of the original image of the shooting target.

If the shooting target is a quadrangle, therefore, image distortion can be automatically and easily corrected. As a result, a highly discriminateable image identical to the original image of the shooting target can be acquired.

Even when the shooting target is a quadrangle whose aspect ratio is unclear and an arbitrary shooting target is shot at an arbitrary view point and pose, image distortion can be corrected by using the focal distance of the digital camera 1.

As a reduced image with a low resolution which is used as a preview image is used to acquire projection parameters, the number of arithmetic operations can be reduced so that the arithmetic operations can be executed efficiently and image processing can be carried out at a high speed.

Because the embodiment is configured in such a way that when a plurality of quadrangles are extracted from a picked-up image, the outermost quadrangle is selected by priority and quadrangles are selected in the descending order from a larger quadrangle to a smaller one by operating the NO key, the cursor keys, etc., the contour of the shooting target can be acquired promptly even if there are plural contour candidates for the shooting target, resulting in acquisition of a highly discriminatable image using a simple scheme.

As image processing correction parameters are acquired from an image undergone distortion correction, better image effect correction can be carried out.

Various modes are available for working out the invention, and the embodiment is not restrictive.

For example, while parameters used in preparing a corrected image are saved in a file of the corrected image in the embodiment, the projection parameters can be saved in a file of the original image. With parameters saved in the original image file, a corrected image can be generated easily from the original image without saving the corrected image.

The header information in this case is composed only of the image size, the projection parameters and the image effect correction parameters as shown in FIG. 32. At the time shooting is performed, the digital camera 1 immediately performs the process of extracting projection parameters without saving the transformed image.

The contents of this shooting process (2) are illustrated in a flowchart shown in FIG. 33.

The image processing apparatus 25 prepares a projection-transformed image (steps S161 to S169), and executes image adjustment, an image effect process of the transformed image and generation of correction data for the header (steps S170 to S172).

The CPU 30 prepares header information as shown in FIG. 32 (step S173).

The image processing apparatus 25 compresses original image data, and the CPU 30 writes the prepared header information, together with the compressed original image data, in the memory card 31 (step S174).

The contents of the re-editing process differ from those shown in FIG. 31. That is, the re-editing process is performed on the original image, not on the corrected image. The contents of the re-editing process are illustrated in a flowchart shown in FIG. 34.

The CPU 30 selects the original image and reads the header information from the file of the original image (steps S181 and S182).

The image processing apparatus 25 immediately prepares a projection-corrected image (step S183), then performs the image effect process (step S184).

The CPU 30 and the image processing apparatus 25 execute the manual projection correcting process, generates header information based on changed projection correction parameters after the correction is finished, and writes the generated header information in the file of the original image again (steps S185 to S187).

In the embodiment, image correction is executed by the digital camera 1. However, image correction can be executed by a computer. In this case, the computer is connected to the computer interface unit 27 and the compute executes the image editing process according to the flowchart shown in FIG. 31. As the computer executes such an image editing process, the operability is improved as the computer has a mouse or the like and makes entry of operation information easier than the digital camera 1. As the display unit of the computer is generally larger than the liquid crystal monitor 12 of the digital camera 1, the user can view an image in more details and can carry out image correction with higher accuracy.

In the embodiment, when a quadrangle cannot be obtained, warning is generated. The embodiment may be modified in such a way that instead of generating warning, an image picked up is displayed and a user is allowed to designate four points of a quadrangle by using the control keys, etc. Affine parameters can be acquired using the four designated points.

Programs are stored in a memory in advance in the foregoing description of the embodiment. However, the programs for causing a computer to operate as all or part of the apparatus or execute the above-described processes are stored in a computer-readable recording medium such as a flexible disk, CD-ROM (compact disk read-only memory), DVD (digital versatile disk) or MO (magneto-optical disk), delivered and installed in a computer so that the computer may operate as various means mentioned above or execute the above-described steps.

The programs may be stored in a disk unit or the like of a server on the Internet, so that the programs may be downloaded to a computer by way of carrier waves on which they are multiplexed.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2003-354392 filed on Oct. 14, 2003 and including specification, claims, drawings and summary. The disclosure of the above Japanese Patent Application is incorporated herein by reference in its entirety.

What is claimed is:

1. An imaging apparatus comprising:
an imaging unit which produces an image of a shooting target; and
an image processing unit which performs image processing on the image produced by the imaging unit, so as to correct distortion of the image of the shooting target;
wherein the image processing unit includes:
a shape acquisition unit which acquires a contour of the image of the shooting target, and which acquires a shape of the image from the acquired contour;
a projection parameter acquisition unit which acquires projection parameters indicating a relationship between the image of the shooting target and a real shooting target from vertex positions of the image of the shooting target by associating the shape of the image acquired by the shape acquisition unit with a shape of the real shooting target; and
an image transformation unit which performs image transformation of the image of the shooting target by using the projection parameters acquired by the projection parameter acquisition unit;
wherein the projection parameter acquisition unit sets a three-dimensional (U, V, W) coordinate system in space where the shooting target is present, lays out a projection surface where the shooting target is projected in the space, sets an (X, Y, Z) coordinate system on the projection surface, and acquires a projection transformation equation composed of projection parameters given in an equation 28 by associating a relational expression given in an equation 26, which is derived from relational expressions given in equations 24 and 25, with a projection transformation equation given in an equation 27 with the shooting target being rectangular, and
the image transformation unit performs image transformation of the image of the shooting target based on the projection transformation equation given in the equation 28:

$$P = S + m \cdot A = n \cdot B \quad \text{Equation 24}$$

where P: coordinates (vector) of a predetermined point of the shooting target,
S: a distance (vector) between an origin of the (U, V, W) coordinate system and the shooting target,
A and B: lengths (vectors) of sides of the shooting target,
m: a coefficient of the vector A ($0.1 \leq m \leq 1$), and
n: a coefficient of the vector B ($0.1 \leq n \leq 1$), $$\begin{cases} Su = k1 \cdot x0 \\ Sv = k1 \cdot y0 \\ Sw = k1 \cdot f \end{cases} \quad \text{Equation 25}$$

$$\begin{cases} Au = k1 \cdot \{x1 - x0 + \alpha \cdot x1\} \\ Av = k1 \cdot \{y1 - y0 + \alpha \cdot y1\} \\ Aw = k1 \cdot \alpha \cdot f \end{cases}$$

$$\begin{cases} Bu = k1 \cdot \{x3 - x0 + \beta \cdot x3\} \\ Bv = k1 \cdot \{y3 - y0 + \beta \cdot y3\} \\ Bw = k1 \cdot \beta \cdot f \end{cases}$$

$$k1 = Sw/f$$

where Su, Sv and Sw: length of the vector S in the three-dimensional (U, V, W) coordinate system,
Au, Av and Aw: length of the vector A,
f: focal distance of a lens of the imaging unit, and
$\alpha$ and $\beta$: coefficients corresponding to the vectors A and B, $$\begin{cases} x = \dfrac{m \cdot (x1 - x0 + \alpha \cdot x1) + n \cdot (x3 - x0 + \beta \cdot x3) + x0}{1 + m \cdot \beta + n \cdot \alpha} \\ y = \dfrac{m \cdot (y1 - y0 + \alpha \cdot y1) + n \cdot (y3 - y0 + \beta \cdot y3) + y0}{1 + m \cdot \alpha + n \cdot \beta} \end{cases} \quad \text{Equation 26}$$

$$\alpha = \dfrac{(x0 - x1 + x2 - x3) \cdot (y3 - y2) - (x3 - x2) \cdot (y0 - y1 + y2 - y3)}{(x1 - x2) \cdot (y3 - y2) - (x3 - x2)(y1 - y2)}$$

$$\beta = \dfrac{(x1 - x2) \cdot (y0 - y1 + y2 - y3) - (x0 - x1 + x2 - x3) \cdot (y1 - y2)}{(x1 - x2) \cdot (y3 - y2) - (x3 - x2)(y1 - y2)}$$

where x and y: coordinates of individual points of the image of the shooting target on the projection surface, and
x0, x1, x2, x3, y0, y1, y2 and y3: coordinate values indicating vertex positions (x0, y0), (x1, y1), (x2, y2) and (x3, y3) of the image of the shooting target projected onto the projection surface, $$(x', y', z') = (u, v, 1) \begin{pmatrix} a_{11} & a_{12} & a_{13} \\ a_{21} & a_{22} & a_{23} \\ a_{31} & a_{32} & a_{33} \end{pmatrix} \quad \text{Equation 27}$$

where x', y' and z': coordinates of individual points of the image of the shooting target projected onto the projection surface, and
x0, x1, x2, x3, y0, y1, y2 and y3: coordinate values indicating vertex positions (x0, y0), (x1, y1), (x2, y2) and (x3, y3) of the image of the shooting target projected onto the projection surface, $$(x', y', z') = (m, n, 1) \begin{pmatrix} x1 - x0 + \alpha \cdot x1 & y1 - y0 + \alpha \cdot y1 & \alpha \\ x3 - x0 + \beta \cdot x3 & y3 - y0 + \beta \cdot y3 & \beta \\ x0 & y0 & 1 \end{pmatrix} \quad \text{Equation 28}$$

2. The imaging apparatus according to claim 1, wherein the image processing unit acquires a size of the image of the shooting target based on a focal distance of a lens of the imaging unit and the vertex positions of the image of the shooting target, and adjusts the acquired size of the image based on the projection parameters acquired by the projection parameter acquisition unit.

3. The imaging apparatus according to claim 1, wherein the shape acquisition unit generates a size-reduced image by reducing a resolution of the image of the shooting target.

4. The imaging apparatus according to claim 1, further comprising a memory unit which stores image data of the shooting target.

5. The imaging apparatus according to claim 4, wherein the memory unit stores image data obtained by the imaging unit before image processing as the image data of the shooting target.

6. The imaging apparatus according to claim 4, wherein the memory unit stores image data which has been image processed by the image processing unit as the image data of the shooting target.

7. The imaging apparatus according to claim 1, further comprising a display unit which displays the image of the shooting target.

8. The imaging apparatus according to claim 7, wherein the image processing unit displays the image of the shooting target on the display unit as a preview image with a lower resolution than a resolution of the image produced by the image processing.

9. An image processing apparatus which corrects distortion of an image of an original acquired by shooting, comprising:
a shape acquisition unit which acquires a contour of the image of the original from the image of the original and acquires a shape of the image of the original from the acquired contour;
a projection parameter acquisition unit which acquires projection parameters indicating a relationship between the shape of the image of the original and a shape of a real original from the shape of the image of the original acquired by the shape acquisition unit; and
an image transformation unit which performs image transformation of the image of the original by using the projection parameters acquired by the projection parameter acquisition unit;
wherein the projection parameter acquisition unit sets a three-dimensional (U, V, W) coordinate system in space where the shooting target is present, lays out a projection surface where the shooting target is projected in the space, sets an (X, Y, Z) coordinate system on the projection surface, and acquires a projection transformation equation composed of projection parameters given in an equation 28 by associating a relational expression given in an equation 26, which is derived from relational expressions given in equations 24 and 25, with a projection transformation equation given in an equation 27 with the shooting target being rectangular, and
the image transformation unit performs image transformation of the image of the shooting target based on the projection transformation equation given in the equation 28:

$$P = S + m \cdot A + n \cdot B \qquad \text{Equation 24}$$

where P: coordinates (vector) of a predetermined point of the shooting target,
S: a distance (vector) between an origin of the (U, V, W) coordinate system and the shooting target,
A and B: lengths (vectors) of sides of the shooting target,
m: a coefficient of the vector A ($0.1 \leq m \leq 1$), and
n: a coefficient of the vector B ($0.1 \leq n \leq 1$), $$\begin{cases} Su = k1 \cdot x0 \\ Sv = k1 \cdot y0 \\ Sw = k1 \cdot f \end{cases} \qquad \text{Equation 25}$$

$$\begin{cases} Au = k1 \cdot \{x1 - x0 + \alpha \cdot x1\} \\ Av = k1 \cdot \{y1 - y0 + \alpha \cdot y1\} \\ Aw = k1 \cdot \alpha \cdot f \end{cases}$$

$$\begin{cases} Bu = k1 \cdot \{x3 - x0 + \beta \cdot x3\} \\ Bv = k1 \cdot \{y3 - y0 + \beta \cdot y3\} \\ Bw = k1 \cdot \beta \cdot f \end{cases}$$

$$k1 = Sw/f$$

where Su, Sv and Sw: length of the vector S in the three-dimensional (U, V, W) coordinate system,
Au, Av and Aw: length of the vector A,
f: focal distance of a lens of the imaging unit, and
$\alpha$ and $\beta$: coefficients corresponding to the vectors A and B, $$\begin{cases} x = \dfrac{m \cdot (x1 - x0 + \alpha \cdot x1) + n \cdot (x3 - x0 + \beta \cdot x3) + x0}{1 + m \cdot \beta + n \cdot \alpha} \\ y = \dfrac{m \cdot (y1 - y0 + \alpha \cdot y1) + n \cdot (y3 - y0 + \beta \cdot y3) + y0}{1 + m \cdot \alpha + n \cdot \beta} \end{cases} \qquad \text{Equation 26}$$

$$\alpha = \frac{(x0 - x1 + x2 - x3) \cdot (y3 - y2) - (x3 - x2) \cdot (y0 - y1 + y2 - y3)}{(x1 - x2) \cdot (y3 - y2) - (x3 - x2)(y1 - y2)}$$

$$\beta = \frac{(x1 - x2) \cdot (y0 - y1 + y2 - y3) - (x0 - x1 + x2 - x3) \cdot (y1 - y2)}{(x1 - x2) \cdot (y3 - y2) - (x3 - x2)(y1 - y2)}$$

where x and y: coordinates of individual points of the image of the shooting target on the projection surface, and
x0, x1, x2, x3, y0, y1, y2 and y3: coordinate values indicating vertex positions (x0, y0), (x1, y1), (x2, y2) and (x3, y3) of the image of the shooting target projected onto the projection surface, $$(x', y', z') = (u, v, 1) \begin{pmatrix} a_{11} & a_{12} & a_{13} \\ a_{21} & a_{22} & a_{23} \\ a_{31} & a_{32} & a_{33} \end{pmatrix} \qquad \text{Equation 27}$$

where x', y' and z': coordinates of individual points of the image of the shooting target projected onto the projection surface, and
x0, x1, x2, x3, y0, y1, y2 and y3: coordinate values indicating vertex positions (x0, y0), (x1, y1), (x2, y2) and (x3, y3) of the image of the shooting target projected onto the projection surface, $$(x', y', z') = (m, n, 1) \begin{pmatrix} x1 - x0 + \alpha \cdot x1 & y1 - y0 + \alpha \cdot y1 & \alpha \\ x3 - x0 + \beta \cdot x3 & y3 - y0 + \beta \cdot y3 & \beta \\ x0 & y0 & 1 \end{pmatrix} \qquad \text{Equation 28}$$

10. An image processing method which performs image processing on an image of a shooting target, acquired by shooting the shooting target, so as to correct distortion of the image of the shooting target, comprising:

acquiring a contour of the image of the shooting target from the image of the shooting target, and acquiring a shape of the image from the acquired contour;

acquiring projection parameters indicating a relationship between the image of the shooting target and a real shooting target from vertex positions of the image of the shooting target by associating the acquired shape of the image with a shape of the real shooting target; and performing image transformation on the image of the shooting target by using the acquired projection parameters;

wherein the projection parameter acquisition unit sets a three-dimensional (U, V, W) coordinate system in space where the shooting target is present, lays out a projection surface where the shooting target is projected in the space, sets an (X, Y, Z) coordinate system on the projection surface, and acquires a projection transformation equation composed of projection parameters given in an equation 28 by associating a relational expression given in an equation 26, which is derived from relational expressions given in equations 24 and 25, with a projection transformation equation given in an equation 27 with the shooting target being rectangular, and the image transformation unit performs image transformation of the image of the shooting target based on the projection transformation equation given in the equation 28:

$$P = S + m \cdot A + n \cdot B \quad \text{Equation 24}$$

where P: coordinates (vector) of a predetermined point of the shooting target,

S: a distance (vector) between an origin of the (U, V, W) coordinate system and the shooting target, A and B: lengths (vectors) of sides of the shooting target, m: a coefficient of the vector A ($0.1 \leq m \leq 1$), and n: a coefficient of the vector B ($0.1 \leq n \leq 1$), $$\begin{cases} Su = k1 \cdot x0 \\ Sv = k1 \cdot y0 \\ Sw = k1 \cdot f \end{cases} \quad \text{Equation 25}$$

$$\begin{cases} Au = k1 \cdot \{x1 - x0 + \alpha \cdot x1\} \\ Av = k1 \cdot \{y1 - y0 + \alpha \cdot y1\} \\ Aw = k1 \cdot \alpha \cdot f \end{cases}$$

$$\begin{cases} Bu = k1 \cdot \{x3 - x0 + \beta \cdot x3\} \\ Bv = k1 \cdot \{y3 - y0 + \beta \cdot y3\} \\ Bw = k1 \cdot \beta \cdot f \end{cases}$$

$$k1 = Sw / f$$

where Su, Sv and Sw: length of the vector S in the three-dimensional (U, V, W) coordinate system, Au, Av and Aw: length of the vector A, f: focal distance of a lens of the imaging unit, and $\alpha$ and $\beta$: coefficients corresponding to the vectors A and B, $$\begin{cases} x = \dfrac{m \cdot (x1 - x0 + \alpha \cdot x1) + n \cdot (x3 - x0 + \beta \cdot x3) + x0}{1 + m \cdot \beta + n \cdot \alpha} \\ y = \dfrac{m \cdot (y1 - y0 + \alpha \cdot y1) + n \cdot (y3 - y0 + \beta \cdot y3) + y0}{1 + m \cdot \alpha + n \cdot \beta} \end{cases} \quad \text{Equation 26}$$

-continued $$\alpha = \frac{(x0 - x1 + x2 - x3) \cdot (y3 - y2) - (x3 - x2) \cdot (y0 - y1 + y2 - y3)}{(x1 - x2) \cdot (y3 - y2) - (x3 - x2)(y1 - y2)}$$

$$\beta = \frac{(x1 - x2) \cdot (y0 - y1 + y2 - y3) - (x0 - x1 + x2 - x3) \cdot (y1 - y2)}{(x1 - x2) \cdot (y3 - y2) - (x3 - x2)(y1 - y2)}$$

where x and y: coordinates of individual points of the image of the shooting target on the projection surface, and x0, x1, x2, x3, y0, y1, y2 and y3: coordinate values indicating vertex positions (x0, y0), (x1, y1), (x2, y2) and (x3, y3) of the image of the shooting target projected onto the projection surface, $$(x', y', z') = (u, v, 1) \begin{pmatrix} a_{11} & a_{12} & a_{13} \\ a_{21} & a_{22} & a_{23} \\ a_{31} & a_{32} & a_{33} \end{pmatrix} \quad \text{Equation 27}$$

where x', y' and z': coordinates of individual points of the image of the shooting target projected onto the projection surface, and x0, x1, x2, x3, y0, y1, y2 and y3: coordinate values indicating vertex positions (x0, y0), (x1, y1), (x2, y2) and (x3, y3) of the image of the shooting target projected onto the projection surface, $$(x', y', z') = (m, n, 1) \begin{pmatrix} x1 - x0 + \alpha \cdot x1 & y1 - y0 + \alpha \cdot y1 & \alpha \\ x3 - x0 + \beta \cdot x3 & y3 - y0 + \beta \cdot y3 & \beta \\ x0 & y0 & 1 \end{pmatrix}. \quad \text{Equation 28}$$

11. A computer readable medium having stored thereon a program for controlling a computer to execute functions of:

acquiring a contour of the image of the shooting target from the image of the shooting target, and acquiring a shape of the image from the acquired contour;

acquiring projection parameters indicating a relationship between the image of the shooting target and a real shooting target from vertex positions of the image of the shooting target by associating the acquired shape of the image with a shape of the real shooting target; and performing image transformation on the image of the shooting target by using the acquired projection parameters;

wherein the projection parameter acquisition unit sets a three-dimensional (U, V, W) coordinate system in space where the shooting target is present, lays out a projection surface where the shooting target is projected in the space, sets an (X, Y, Z) coordinate system on the projection surface, and acquires a projection transformation equation composed of projection parameters given in an equation 28 by associating a relational expression given in an equation 26, which is derived from relational expressions given in equations 24 and 25, with a projection transformation equation given in an equation 27 with the shooting target being rectangular, and the image transformation unit performs image transformation of the image of the shooting target based on the projection transformation equation given in the equation 28:

$$P = S + m \cdot A + n \cdot B \quad \text{Equation 24}$$

where P: coordinates (vector) of a predetermined point of the shooting target,
S: a distance (vector) between an origin of the (U, V. W) coordinate system and the shooting target,
A and B: lengths (vectors) of sides of the shooting target,
m: a coefficient of the vector A ($0.1 \leq m \leq 1$), and
n: a coefficient of the vector B ($0.1 \leq n \leq 1$), $$\begin{cases} Su = k1 \cdot x0 \\ Sv = k1 \cdot y0 \\ Sw = k1 \cdot f \end{cases} \quad \text{Equation 25}$$

$$\begin{cases} Au = k1 \cdot \{x1 - x0 + \alpha \cdot x1\} \\ Av = k1 \cdot \{y1 - y0 + \alpha \cdot y1\} \\ Aw = k1 \cdot \alpha \cdot f \end{cases}$$

$$\begin{cases} Bu = k1 \cdot \{x3 - x0 + \beta \cdot x3\} \\ Bv = k1 \cdot \{y3 - y0 + \beta \cdot y3\} \\ Bw = k1 \cdot \beta \cdot f \end{cases}$$

$$k1 = Sw/f$$

where Su, Sv and Sw: length of the vector S in the three-dimensional (U, V, W) coordinate system,
Au, Av and Aw: length of the vector A,
f: focal distance of a lens of the imaging unit, and
$\alpha$ and $\beta$: coefficients corresponding to the vectors A and B, $$\begin{cases} x = \dfrac{m \cdot (x1 - x0 + \alpha \cdot x1) + n \cdot (x3 - x0 + \beta \cdot x3) + x0}{1 + m \cdot \beta + n \cdot \alpha} \\ y = \dfrac{m \cdot (y1 - y0 + \alpha \cdot y1) + n \cdot (y3 - y0 + \beta \cdot y3) + y0}{1 + m \cdot \alpha + n \cdot \beta} \end{cases} \quad \text{Equation 26}$$

$$\alpha = \frac{(x0 - x1 + x2 - x3) \cdot (y3 - y2) - (x3 - x2) \cdot (y0 - y1 + y2 - y3)}{(x1 - x2) \cdot (y3 - y2) - (x3 - x2)(y1 - y2)}$$

$$\beta = \frac{(x1 - x2) \cdot (y0 - y1 + y2 - y3) - (x0 - x1 + x2 - x3) \cdot (y1 - y2)}{(x1 - x2) \cdot (y3 - y2) - (x3 - x2)(y1 - y2)}$$

where x and y: coordinates of individual points of the image of the shooting target on the projection surface, and
x0, x1, x2, x3, y0, y1, y2 and y3: coordinate values indicating vertex positions (x0, y0), (x1, y1), (x2, y2) and (x3, y3) of the image of the shooting target projected onto the projection surface, $$(x', y', z') = (u, v, 1) \begin{pmatrix} a_{11} & a_{12} & a_{13} \\ a_{21} & a_{22} & a_{23} \\ a_{31} & a_{32} & a_{33} \end{pmatrix} \quad \text{Equation 27}$$

where x', y' and z': coordinates of individual points of the image of the shooting target projected onto the projection surface, and
x0, x1, x2, x3, y0, y1, y2 and y3: coordinate values indicating vertex positions (x0, y0), (x1, y1), (x2, y2) and (x3, y3) of the image of the shooting target projected onto the projection surface, $$(x', y', z') = (m, n, 1) \begin{pmatrix} x1 - x0 + \alpha \cdot x1 & y1 - y0 + \alpha \cdot y1 & \alpha \\ x3 - x0 + \beta \cdot x3 & y3 - y0 + \beta \cdot y3 & \beta \\ x0 & y0 & 1 \end{pmatrix}. \quad \text{Equation 28}$$

* * * * *

UNITED STATES PATENT AND TRADEMARK OFFICE
CERTIFICATE OF CORRECTION

PATENT NO. : 7,486,310 B2
APPLICATION NO. : 10/965639
DATED : February 3, 2009
INVENTOR(S) : Keiichi Sakurai It is certified that error appears in the above-identified patent and that said Letters Patent is hereby corrected as shown below:

On the Title Page:

Item (56), References Cited, Foreign Patent Documents;

| | | | | |
|---|---|---|---|---|
| Insert --JP | 05-266161 | A | 10/1993 | |
| JP | 06-274649 | A | 09/1994 | |
| JP | 2001-223891 | A | 08/2001 | |
| JP | 2003-078725 | A | 03/2003 | |
| JP | 2003-141520 | A | 05/2003 | |
| JP | 2003-288588 | A | 10/2003--. | |

Signed and Sealed this

Eighth Day of September, 2009

David J. Kappos
*Director of the United States Patent and Trademark Office*